US010765119B2

(12) United States Patent
Johnson et al.

(10) Patent No.: US 10,765,119 B2
(45) Date of Patent: Sep. 8, 2020

(54) SYSTEMS FOR AN OVEN WITH UPPER AND LOWER HEAT PACKS

(71) Applicant: OVENTION, INC., Milwaukee, WI (US)

(72) Inventors: Alex Johnson, Mesquite, TX (US); Charles J. Martis, Murphy, TX (US); James P. Virgin, Sturgeon Bay, WI (US); Thomas J. Dulak, Luxemburg, WI (US); Steven Everett, Jr., Delafield, WI (US)

(73) Assignee: Ovention, Inc., Milwaukee, WI (US)

( * ) Notice: Subject to any disclaimer, the term of this patent is extended or adjusted under 35 U.S.C. 154(b) by 495 days.

(21) Appl. No.: 15/601,684

(22) Filed: May 22, 2017

(65) Prior Publication Data

US 2017/0332646 A1    Nov. 23, 2017

Related U.S. Application Data

(60) Provisional application No. 62/339,477, filed on May 20, 2016.

(51) Int. Cl.
*A21B 3/07* (2006.01)
*F24C 15/16* (2006.01)
*F24C 15/32* (2006.01)

(52) U.S. Cl.
CPC .......... *A21B 3/07* (2013.01); *F24C 15/16* (2013.01); *F24C 15/162* (2013.01); *F24C 15/168* (2013.01); *F24C 15/325* (2013.01)

(58) Field of Classification Search
USPC ........... 219/400, 388, 411; 126/337 R, 21 A, 126/275 E; 99/443 C, 386
See application file for complete search history.

(56) References Cited

U.S. PATENT DOCUMENTS

| 4,922,079 A | 5/1990 | Bowen et al. |
| 4,951,648 A * | 8/1990 | Shukla ............... A21B 1/245 126/21 A |

(Continued)

FOREIGN PATENT DOCUMENTS

| AU | 2635977 A | 1/1979 |
| EP | 0423048 A1 | 4/1991 |
| EP | 1468610 A1 | 10/2004 |

OTHER PUBLICATIONS

PCT International Search Report and Written Opinion; Int'l Appln No. PCT/US2017/033838; dated Sep. 18, 2017; 22 pages.

(Continued)

*Primary Examiner* — Vivek K Shirsat
(74) *Attorney, Agent, or Firm* — Quarles & Brady LLP

(57) ABSTRACT

Systems and methods for an oven include a housing, a heating chamber positioned within the housing, at least one oven door to provide access to the heating chamber, an external nesting rack positionable on or near the housing, and a movable cook surface, the movable cook surface movable between a position within the heating chamber and a position at least partially external to the heating chamber, such that when the movable cook surface is in the position at least partially external to the heating chamber, the movable cook surface is positioned at least partially recessed below a top surface of the external nesting rack. One or more heat packs can be included to provide variable forms of heat to the heating chamber.

31 Claims, 20 Drawing Sheets

(56) References Cited

U.S. PATENT DOCUMENTS

| | | |
|---|---|---|
| 5,473,975 A | 12/1995 | Bruno et al. |
| 5,906,485 A | 5/1999 | Groff et al. |
| 9,161,547 B2 | 10/2015 | McKee |
| 2002/0134368 A1 | 9/2002 | Moshonas et al. |
| 2008/0141867 A1 | 6/2008 | Cavada et al. |
| 2009/0139976 A1 | 6/2009 | Lee |
| 2011/0139140 A1* | 6/2011 | Baker .................... A21B 1/245 126/1 AD |
| 2018/0142900 A1 | 5/2018 | McKee et al. |

OTHER PUBLICATIONS

European Patent Office, Extended European Search Report, Application No. 17800332.3, Mar. 20, 2020, 12 pages.

* cited by examiner

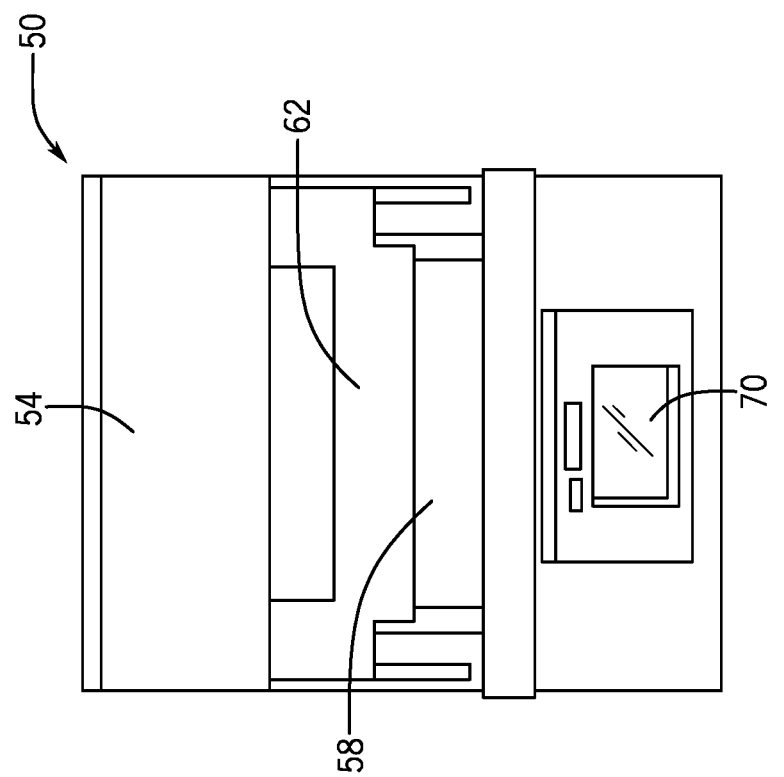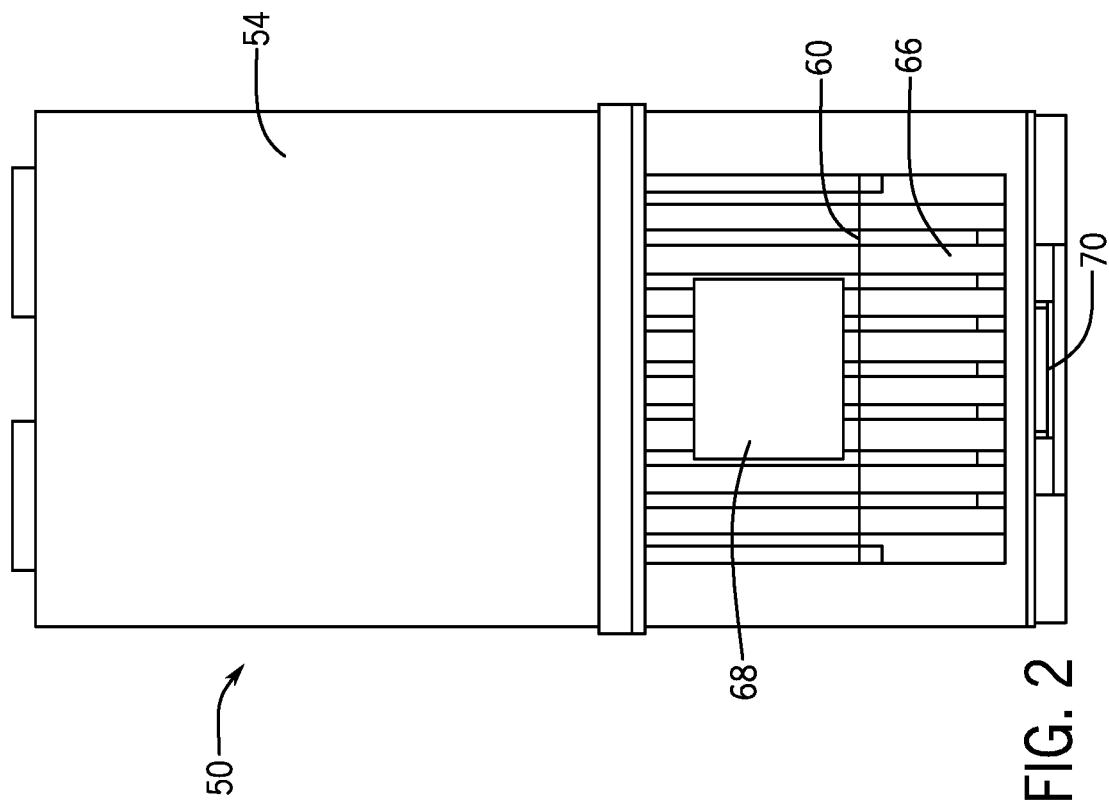

SYSTEMS FOR AN OVEN WITH UPPER AND LOWER HEAT PACKS

CROSS-REFERENCES TO RELATED APPLICATIONS

This application claims priority to U.S. Provisional Application No. 62/339,477 filed on May 20, 2016, and titled "Systems and Methods for an Auto-Loading Oven With a Moving Cook Surface," which is hereby incorporated by reference.

STATEMENT REGARDING FEDERALLY SPONSORED RESEARCH

Not Applicable

BACKGROUND OF THE TECHNOLOGY

The subject matter disclosed within relates generally to cooking ovens, and more particularly to systems and methods for an oven with a movable cook surface.

For most ovens, food, or anything to be heated, is placed on a cook surface. With some ovens, the cook surface can be moved at least partially outside of the heating chamber either manually or by motorized control. With the food placed on the cook surface, the cook surface is then moved back into the heating chamber, again either manually or by motorized control. After the food has been heated, the cook surface, along with the food positioned thereon, can then be removed from the heating chamber, again either manually or by motorized control. Not only will the food be hot, but the cook surface will also be hot. The exposed hot cook surface can be a concern to an operator of the oven or to others that may inadvertently come into contact with the hot cook surface.

What is needed is an oven where the hot cook surface can be positioned at least partially outside of the heating chamber and yet reduce exposure to contact the hot cook surface.

BRIEF SUMMARY OF THE TECHNOLOGY

The above problems can be solved by providing an oven with a movable cook surface, where the movable cook surface is positionable within or below an external nesting rack.

Systems and methods for an oven are disclosed. The oven can include a housing, a heating chamber positioned within the housing, at least one oven door to provide access to the heating chamber, an external nesting rack positionable on or near the housing, and a movable cook surface, the movable cook surface movable between a position within the heating chamber and a position at least partially external to the heating chamber, such that when the movable cook surface is in the position external to the heating chamber, the movable cook surface is positioned at least partially recessed below a top surface of the external nesting rack. The at least partially recessed movable cook surface can be positioned within the external nesting rack. The movable cook surface can include fingers and spacings between the fingers. The external nesting rack can include support surfaces and spacings between the support surfaces. The fingers of the movable cook surface can move within the spacings between the support surfaces as the movable cook surface is moving between the position within the heating chamber and the position at least partially external to the heating chamber. The external nesting rack is removably coupled to the housing. The external nesting rack can move from a position below the movable cook surface to a position at least partially above the movable cook surface, such that the top surface of the external nesting rack is above the movable cook surface. The heating element can heat air within a cavity for distribution to an upper air plenum and a lower air plenum. A first heating element can be included to provide a first method of heating. The first method of heating can provide heated air convection to the heating chamber. A second heating element can be included to provide a second method of heating, the second method of heating being different than the first method of heating. The second method of heating can provide infrared heating to the heating chamber. A user interface can be included, the user interface to allow individual control of the first method of heating and the second method of heating.

Systems and methods for a heat pack are disclosed. The heat pack can include at least one heat unit, the heat unit including a trough, the trough including an open gap between at least a first side wall and a second side wall, the trough forming a protective housing for at least one heating element positioned within the trough; a cover, the cover positioned on the open gap, the cover including a first edge connector and a second edge connector, the first edge connector to engage with the first side wall and the second edge connector to engage with the second side wall, the cover including a series of perforations; and heating element support structure, the heating element support structure coupled to at least one of the trough and the cover, the heating element support structure to isolate the at least one heating element from the trough and the cover. The at least one heating element can be a resistive heating element to provide infrared heat. The at least one heating element is at least one of an open coil resistive heating element, a sheathed tubular resistive element, a ribbon resistive heating element, and an infrared heating lightbulb. The heating element support structure can be a ceramic material. The heat unit can be substantially straight. A plurality of heat units can be included, each heat unit being generally parallel to each other with a predetermined space between each heat unit; and a frame, the frame to support a first end of each of the plurality of the heat units and a second end of each of the plurality of the heat units. Each of the plurality of heat units can be individually controllable by a control system.

Systems and methods for an oven are disclosed. The oven can include a housing; a heating chamber positioned within the housing; at least one oven door to provide access to the heating chamber; at least one heating element to heat air in a cavity within the housing for distribution to an upper air plenum and a lower air plenum to provide a heated air convection; a cook surface positioned in the heating chamber, the cook surface to support an item for heating within the heating chamber; an upper heat pack positioned between the upper air plenum and the cook surface to direct infrared heat downward into the heating chamber; a lower heat pack positioned between the lower air plenum and the cook surface to direct infrared heat upward into the heating chamber; the upper heat pack including a plurality of upper heat units supported by an upper frame and being generally parallel to each other with a predetermined space between each upper heat unit, each upper heat unit including an upper heat unit trough, the upper heat unit trough including an open gap between at least a first side wall and a second side wall, the upper heat unit trough forming a protective housing for at least one upper heat unit resistive heating element positioned within the upper heat unit trough and supported by an upper heat unit heating element support structure, and an upper heat unit cover positioned on the open gap, the upper heat unit cover including a series of perforations; the lower heat pack including a plurality of lower heat units supported by a lower frame and being generally parallel to each other with a predetermined space between each lower heat unit, each lower heat unit including a lower heat unit trough, the lower heat unit trough including an open gap between at least a first side wall and a second side wall, the lower heat unit trough forming a protective housing for at least one lower heat unit resistive heating element positioned within the lower heat unit trough and supported by a lower heat unit heating element support structure, and a lower heat unit cover positioned on the open gap, the lower heat unit cover including a series of perforations; wherein the heated air passes through the upper air plenum and the predetermined space between each upper heat unit and into the heating chamber such that a flow path of the heated air convention is directed to avoid contact with the upper heat unit resistive heating element positioned within the upper heat unit trough; and wherein the heated air passes through the lower air plenum and the predetermined space between each lower heat unit and into the heating chamber such that the flow path of the heated air convention is directed to avoid contact with the lower heat unit resistive heating element positioned within the lower heat unit trough. A user interface can be included, the user interface to allow individual control of the upper heat pack and the lower heat pack. The user interface can further allow individual control of each upper heat unit in the upper heat pack and each lower heat unit in the lower heat pack. The upper heat unit cover can include a first edge connector and a second edge connector, the first edge connector to engage with the first side wall of the upper heat unit trough and the second edge connector to engage with the second side wall of the upper heat unit trough; and the lower heat unit cover can include a first edge connector and a second edge connector, the first edge connector to engage with the first side wall of the lower heat unit trough and the second edge connector to engage with the second side wall of the lower heat unit trough. The upper heat unit heating element support structure can be coupled to at least one of the upper heat unit trough and the upper heat unit cover, the upper heat unit heating element support structure to isolate the at least one upper heat unit heating element from the upper heat unit trough and the upper heat unit cover; and the lower heat unit heating element support structure can be coupled to at least one of the lower heat unit trough and the lower heat unit cover, the lower heat unit heating element support structure to isolate the at least one lower heat unit heating element from the lower heat unit trough and the lower heat unit cover. The upper heat unit resistive heating element is at least one of an open coil resistive heating element, a sheathed tubular resistive element, a ribbon resistive heating element, and an infrared heating lightbulb; and the lower heat unit resistive heating element is at least one of an open coil resistive heating element, a sheathed tubular resistive element, a ribbon resistive heating element, and an infrared heating lightbulb. The upper heat unit heating element support structure can be a ceramic material; and the lower heat unit heating element support structure can be a ceramic material. An external nesting rack can be included and can be positionable on or near the housing; and the cook surface being movable, the movable cook surface movable between a position within the heating chamber and a position at least partially external to the heating chamber, such that when the movable cook surface is in the position at least partially external to the heating chamber, the movable cook surface is positioned at least partially recessed below a top surface of the external nesting rack. A movement system can be included to move the movable cook surface.

Systems and methods for moving an item from an oven are disclosed. The oven can include a housing, a heating chamber positioned within the housing, at least one oven door to provide access to the heating chamber, an external nesting rack positionable on or near the housing, and a movable cook surface, and the method can include the steps of: moving the movable cook surface with the item on the movable cook surface from a position within the heating chamber to a position at least partially external to the heating chamber; and positioning the movable cook surface at least partially recessed below a top surface of the external nesting rack, such that the item on the movable cook surface is no longer on the movable cook surface and is transferred to being positioned on the top surface of the external nesting rack. The movable cook surface can include fingers and spacings between the fingers, and the external nesting rack can include support surfaces and spacings between the support surfaces, the method can further include: moving the fingers of the movable cook surface within the spacings between the support surfaces as the movable cook surface is moving between the position within the heating chamber and the position at least partially external to the heating chamber, wherein the item on the movable cook surface is transferred to being positioned on the top surface of the external nesting rack as the movable cook surface is moved at least partially recessed below the top surface of the external nesting rack.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF DRAWINGS

The technology will be better understood and features, aspects and advantages other than those set forth above will become apparent when consideration is given to the following detailed description thereof. Such detailed description makes reference to the following drawings.

FIG. 2 is a plan view of the oven of FIG. 1, according to embodiments of the disclosure;

FIG. 3 is a front view of the oven of FIG. 1, with the oven door partially open, according to embodiments of the disclosure;

Figure 1:
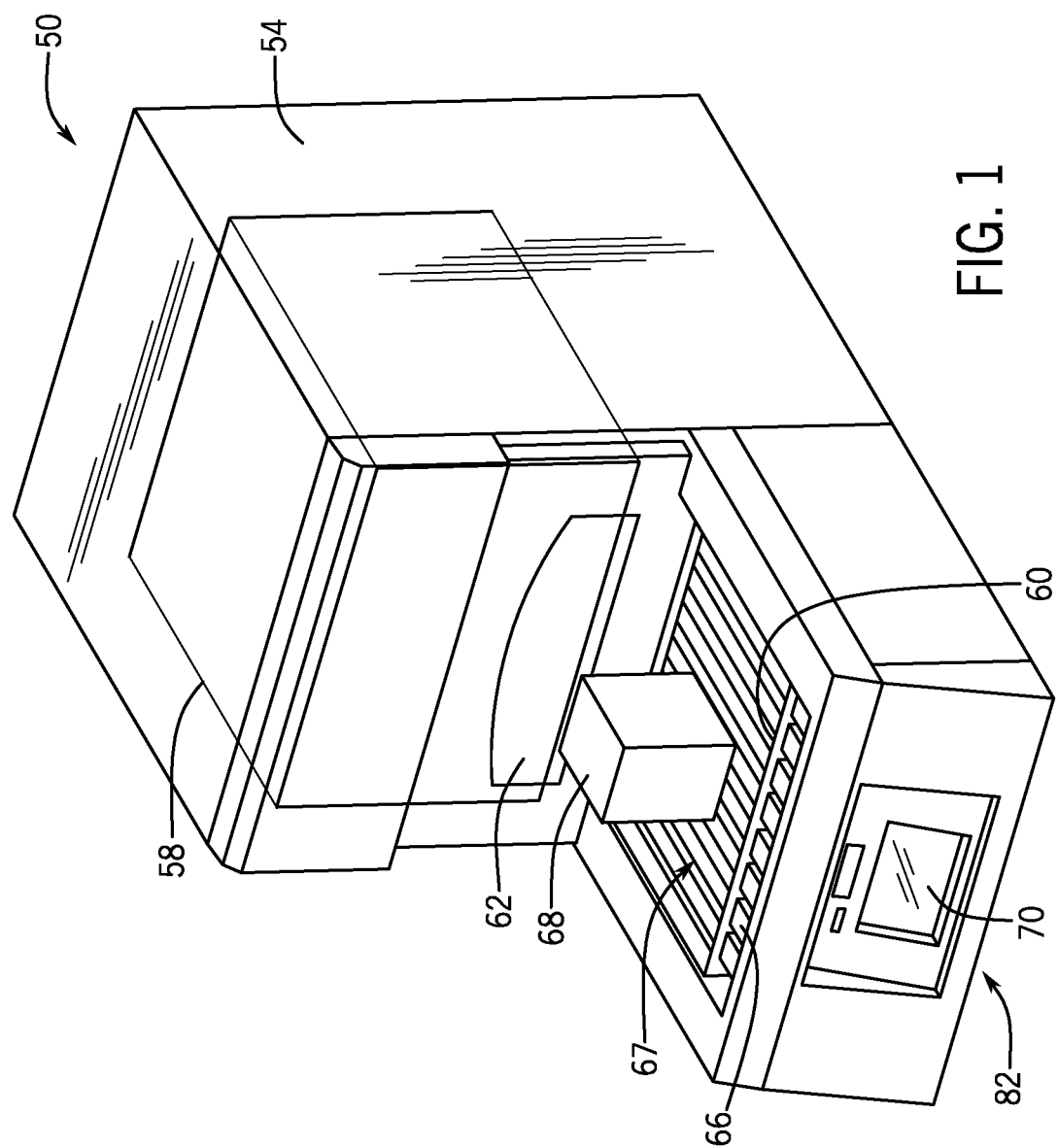
FIG. 1 is a perspective view of an oven with a movable cook surface, according to embodiments of the disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF THE EMBODIMENTS

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. As used herein, the singular forms "a", "an", and "the" include plural embodiments unless the context clearly dictates otherwise.

As used herein, unless otherwise specified or limited, "at least one of A, B, and C," and the like, is meant to indicate A, or B, or C, or any combination of A, B, and/or C. As such, these and similar phrases can include single or multiple instances of A, B, and/or C, and, in the case that any of A, B, and/or C indicates a category of elements, single or multiple instances of any of the elements of the category (or categories).

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

Referring now to FIGS. 1-3, there are depicted embodiments of an oven 50. The oven 50 is defined by a housing 54 having a heating chamber 58. The housing 54, as well as the heating chamber 58, can have at least a first oven door 62 for access to the heating chamber 58, and ingress and egress of a movable cook surface 60. The oven door 62 is shown partially open in FIG. 3. The oven 50 further includes an external nesting rack 66 to provide a load and unload location 67 for items 68 to be moved into the heating chamber 58 and for items 68 coming out of the heating chamber 58. A user interface 70 is available for a user to enter oven control related data. It is to be appreciated that the concepts described herein can be incorporated within an oven having two oven doors, such as a known conveyor oven arrangement.

In general terms, the oven 50 can include at least three primary systems; a heating and airflow system 74, a movement system 78 for moving the movable cook surface 60 and moving the oven door 62, and a control system 82 to control the heating and airflow system 74 and the movement system 78. Each of these systems will be described below.

Figure 4:
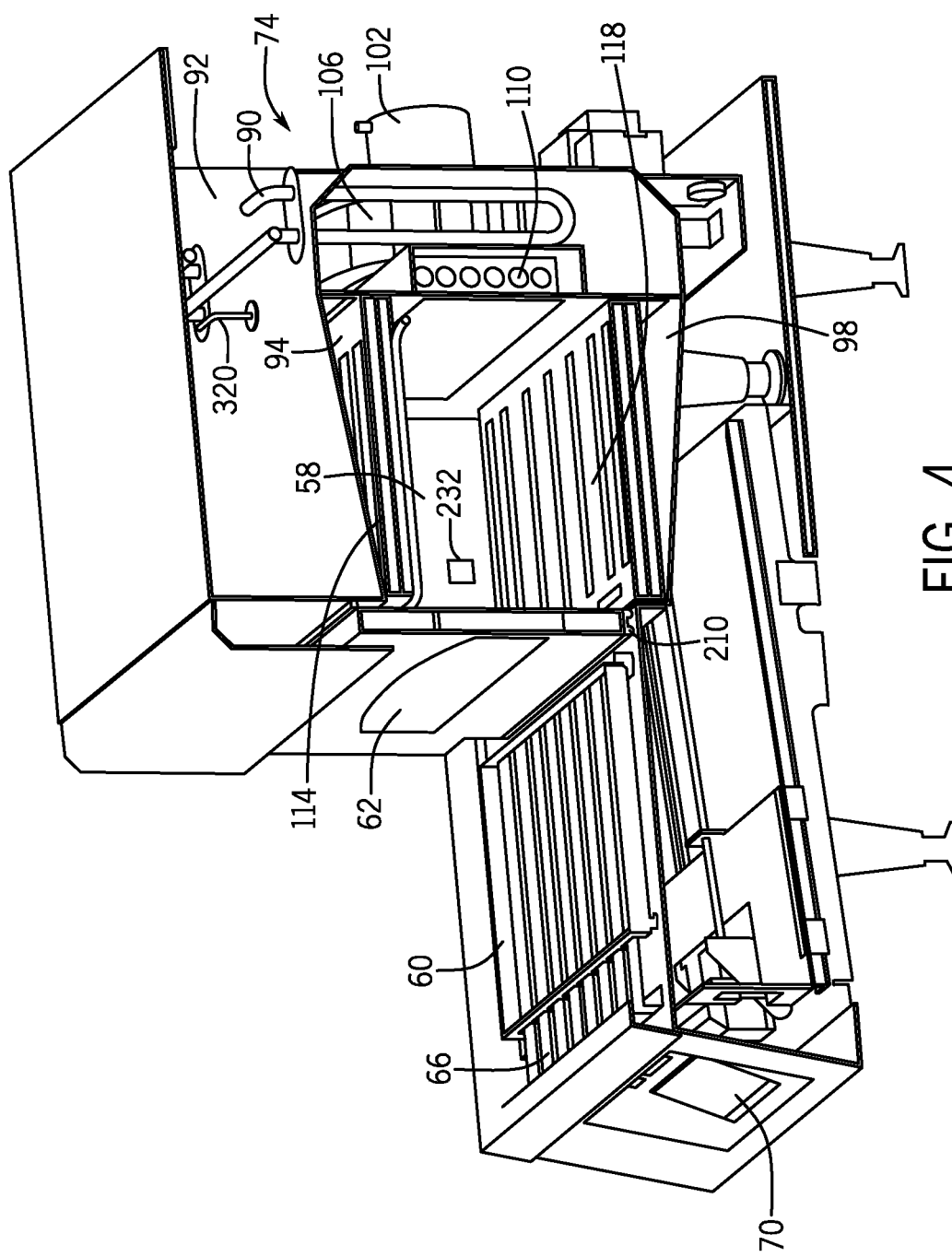
FIG. 4 is a perspective view of an oven in partial section with surfaces removed for visibility, and showing aspects of the oven and a movable cook surface positioned exterior to a heating chamber, according to embodiments of the disclosure.
Figure 5:
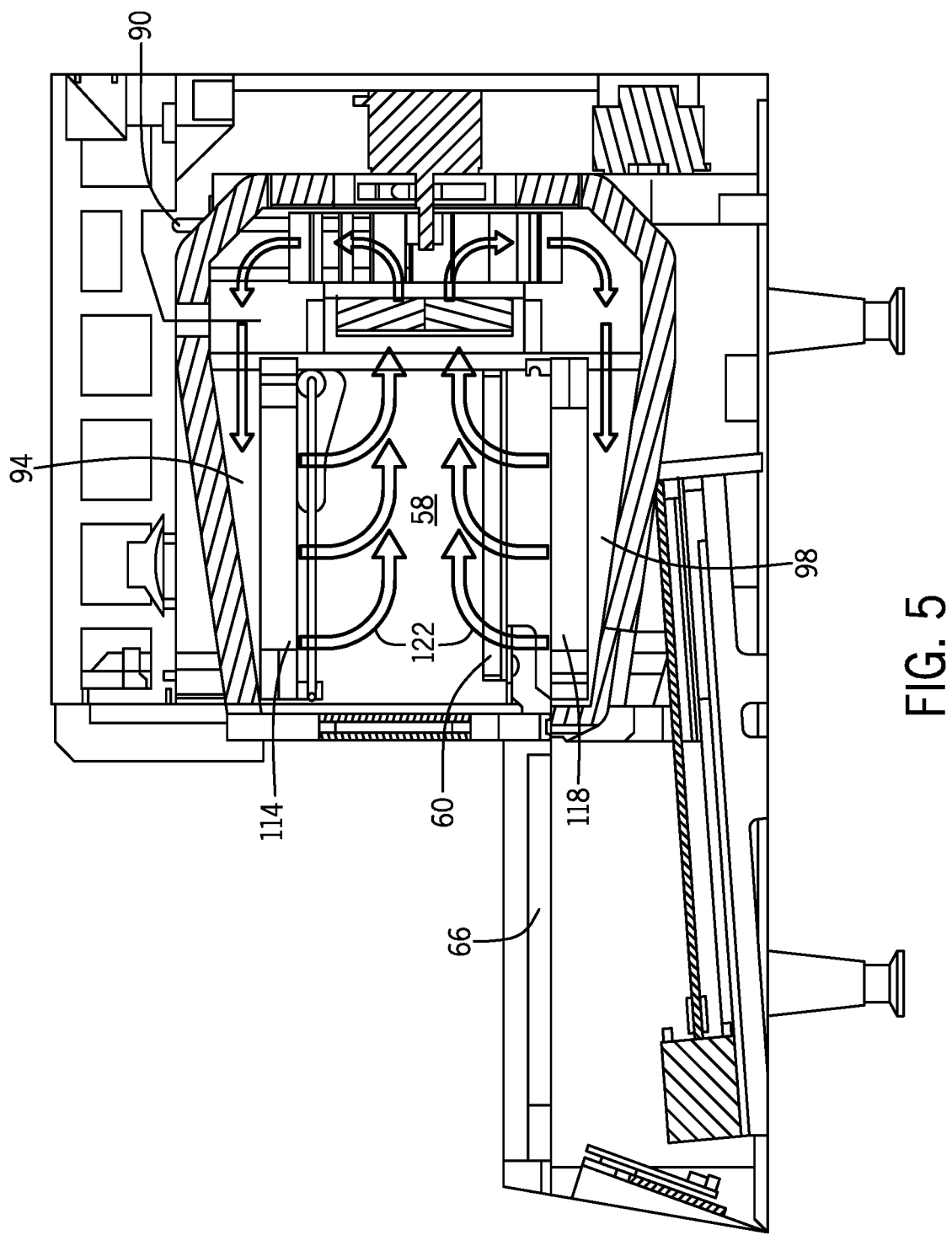
FIG. 5 is a side view of an oven in partial section, and showing aspects of the oven and exemplary flow paths of heated air, according to embodiments of the disclosure.

Referring to FIGS. 4-5 the oven 50 can include the heating and airflow system 74 to supply various forms of heat to the heating chamber 58 for heating any item or items 68, e.g., food, that have been carried into the heating chamber 58 through the oven door 62 via the movable cook surface 60.

In some embodiments, at least one cavity heating element 90 can heat air within cavity 92 for distribution to an upper air plenum 94 and a lower air plenum 98. A motor 102, e.g., a brushless DC motor, a servo motor, a stepper motor, or any known motor, can spin an air mover 106, e.g., a blower wheel such as a backward incline blower wheel, or a fan, to draw heated air from the cavity 92 through the center of the blower wheel and to expel the heated air out the perimeter of the blower wheel 106 into the upper and/or lower air plenums 94, 98 to produce a convection oven system. In some embodiments, the heated air can pass through a catalyst 110. The catalyst 110 serves to trigger an oxidation reduction reaction, i.e., combustion, of hydrocarbons, e.g., grease and smoke, at a lower temperature than would naturally occur. Through this process, the hydrocarbons react with oxygen in a known process to produce heat, water vapor, and carbon dioxide.

In some embodiments, the heated air can pass through a heat pack 114. In the embodiment shown in FIGS. 4-5, an upper heat pack 114 and a lower heat pack 118 are included. The flow of air through the upper and lower plenums 94 and 98, and through the upper and lower heat packs 114 and 118, can provide a closed loop air path 122 to provide the heated air convection. It is to be appreciated that the air path 122 does not need to be a closed loop air path, and that an open loop air path is also envisioned. Furthermore, in some embodiments, only an upper heat pack or a lower heat pack are included. In addition, it is to be appreciated that in some embodiments, no air is required to pass through the upper heat pack 114 or the lower heat pack 118, and in some embodiments, air passing through the upper heat pack 114 or the lower heat pack 118 does not need to be heated.

Upper heat pack 114 and/or lower heat pack 118 can be included to provide additional forms of heating. For example, upper heat pack 114 can include an additional form of heat source, e.g., a resistive heating element, to supply additional heat, e.g., in the form of infrared radiation, towards any item located in the heating chamber 58.

It is to be appreciated that other heating elements, such as microwave, steam or a combination thereof, can be used instead of or in combination with a resistive element. It is also to be appreciated that the heated air convection and any additional heating elements or sources can be independently controlled by the control system 82. Upper heat pack 114 and lower heat pack 118 can provide the same form of heat, or each can provide different forms of heat. As a non-limiting example, upper heat pack 114 can provide infrared radiation, and lower heat pack 118 can provide steam.

Figure 6:
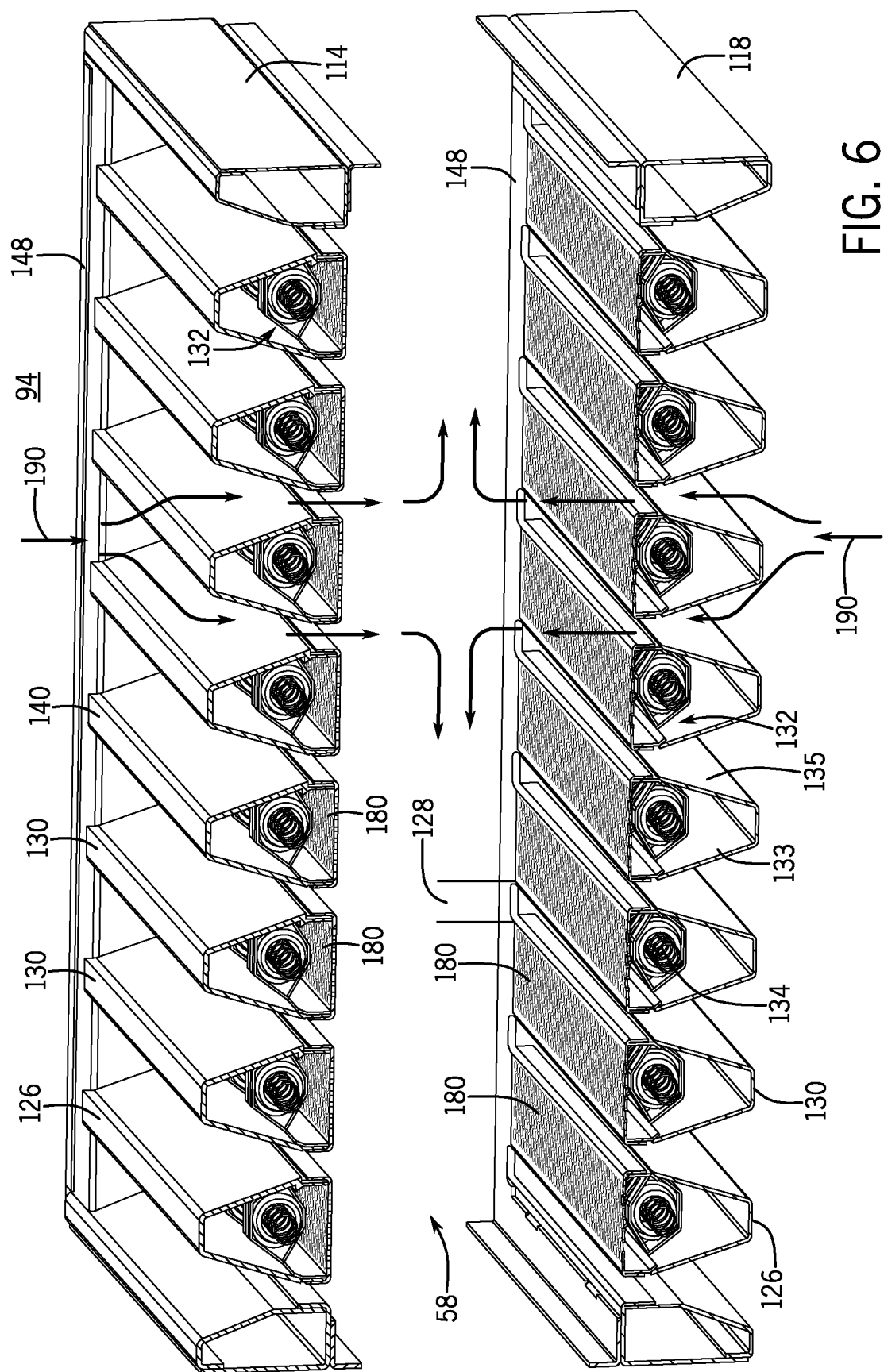
FIG. 6 is a perspective view of an upper heat pack and a lower heat pack in section, and showing an exemplary flow path of heated air, according to embodiments of the disclosure.
Figure 7:
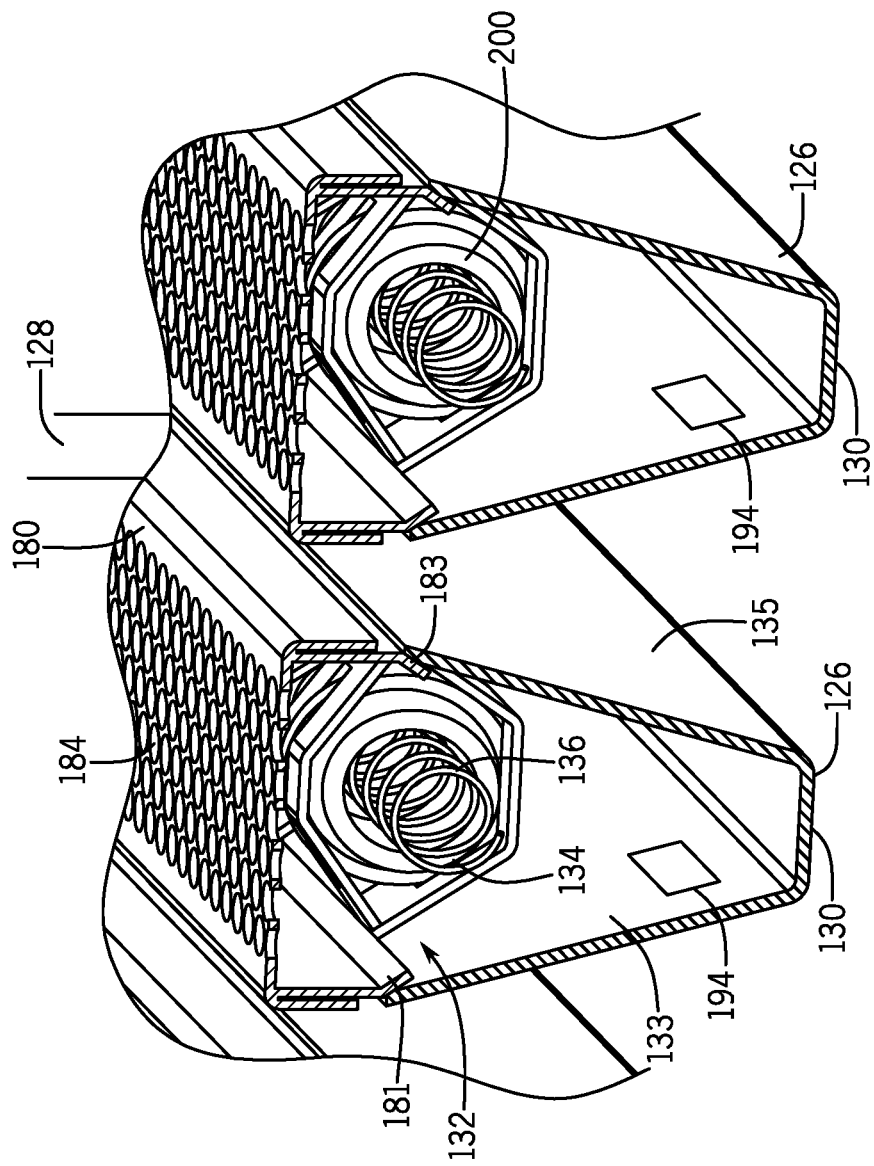
FIG. 7 is a close-up perspective view in section of a trough and resistive heating element, according to embodiments of the disclosure.
Figure 8:
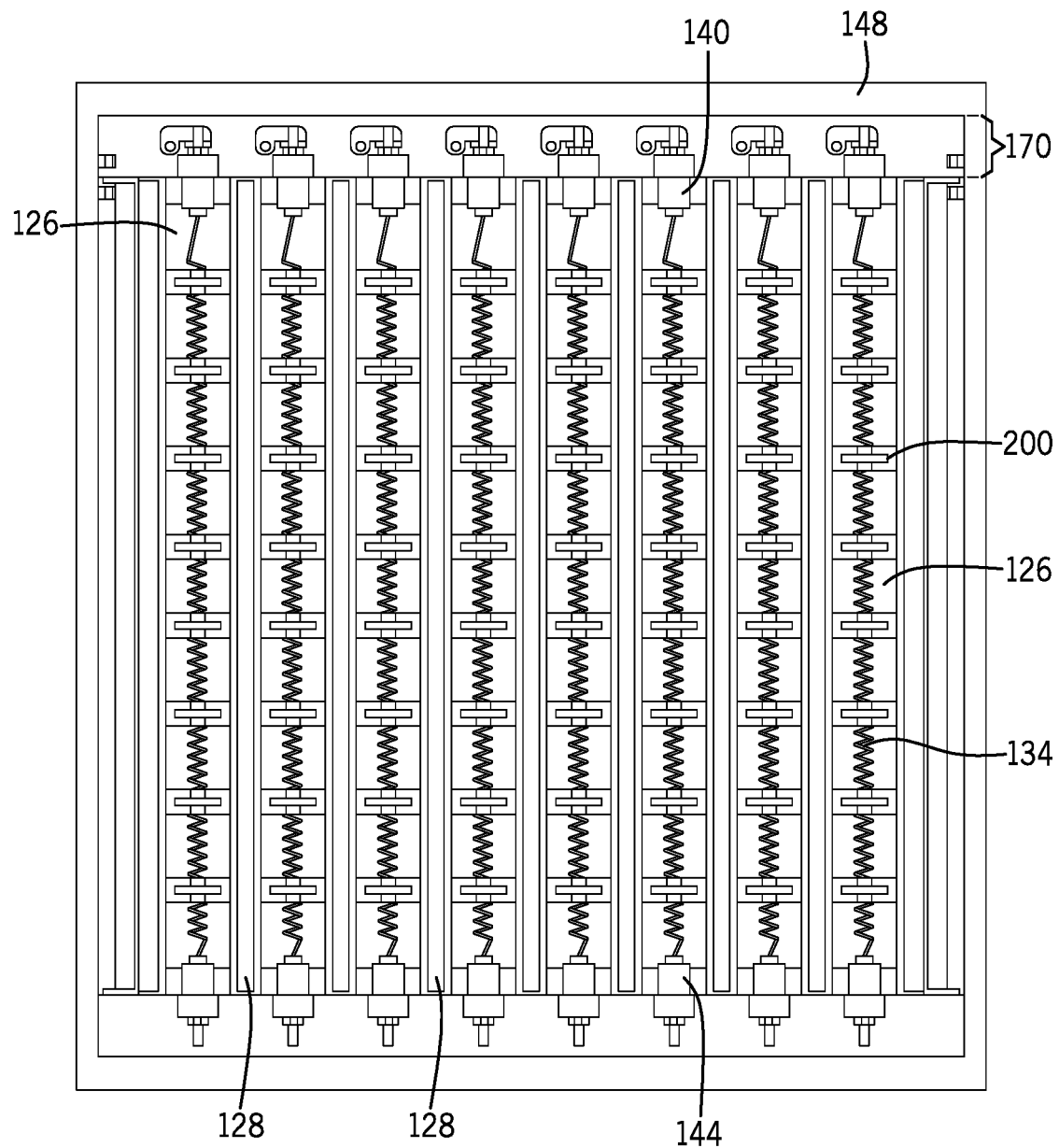
FIG. 8 is a plan view of a heat pack with the trough covers removed to show the resistive heating elements and support structure, according to embodiments of the disclosure.

Referring to FIGS. 6-8, each heat pack 114, 118 is shown in section and includes a series of generally parallel individual heat units 126, each heat unit 126 including a trough 130, with each trough 130 having an open gap 132 between at least a first side wall 133 and a second side wall 135, the trough 130 forming a protective housing for at least one resistive heating element 134. A predetermined space 128 is positioned between each heat unit 126 and can be adjusted to control the flow of air between the heat units.

In some embodiments, each trough 130 can be supported on a first end 140 and a second end 144 by a heat pack frame 148 (see FIG. 8). A trough 130 can be generally "V" shaped, as shown, or can be other protective shapes, such as a "C" shape, or rectangular with an open edge, as a non-limiting examples, or any other shape to provide the protective housing for the resistive heating element 134. The trough 130 can also serve to collect debris within the heating chamber 58 from the heating or cooking process.

Figure 9:
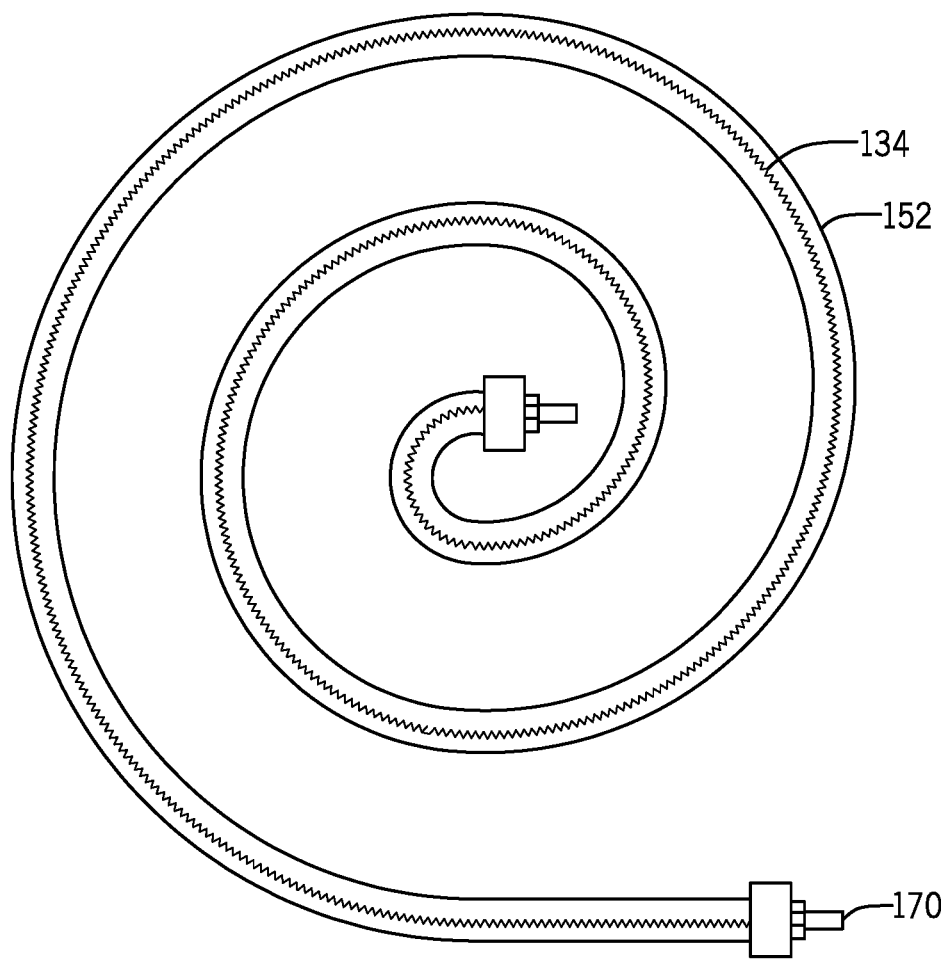
FIGS. 9-12 show alternative shapes for a trough and heating element, according to embodiments of the disclosure.
Figure 10:
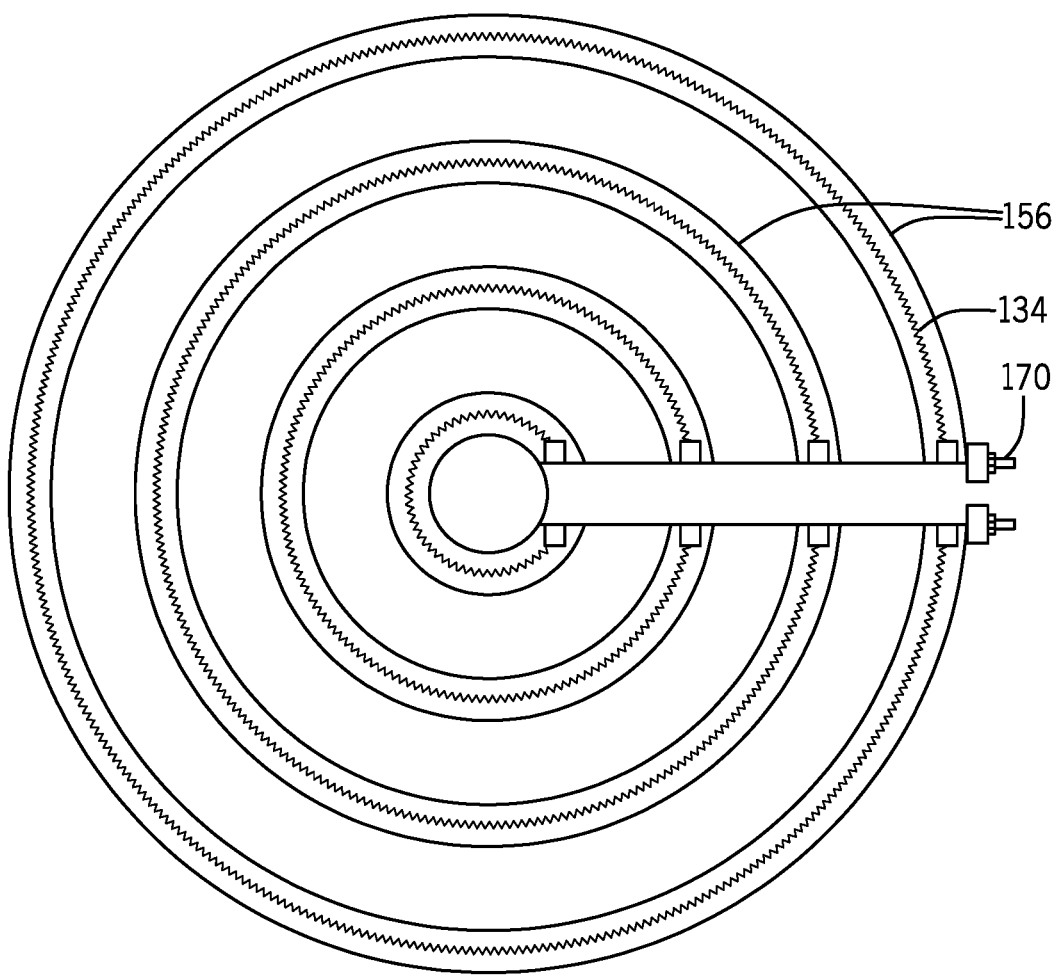
Figure 11:
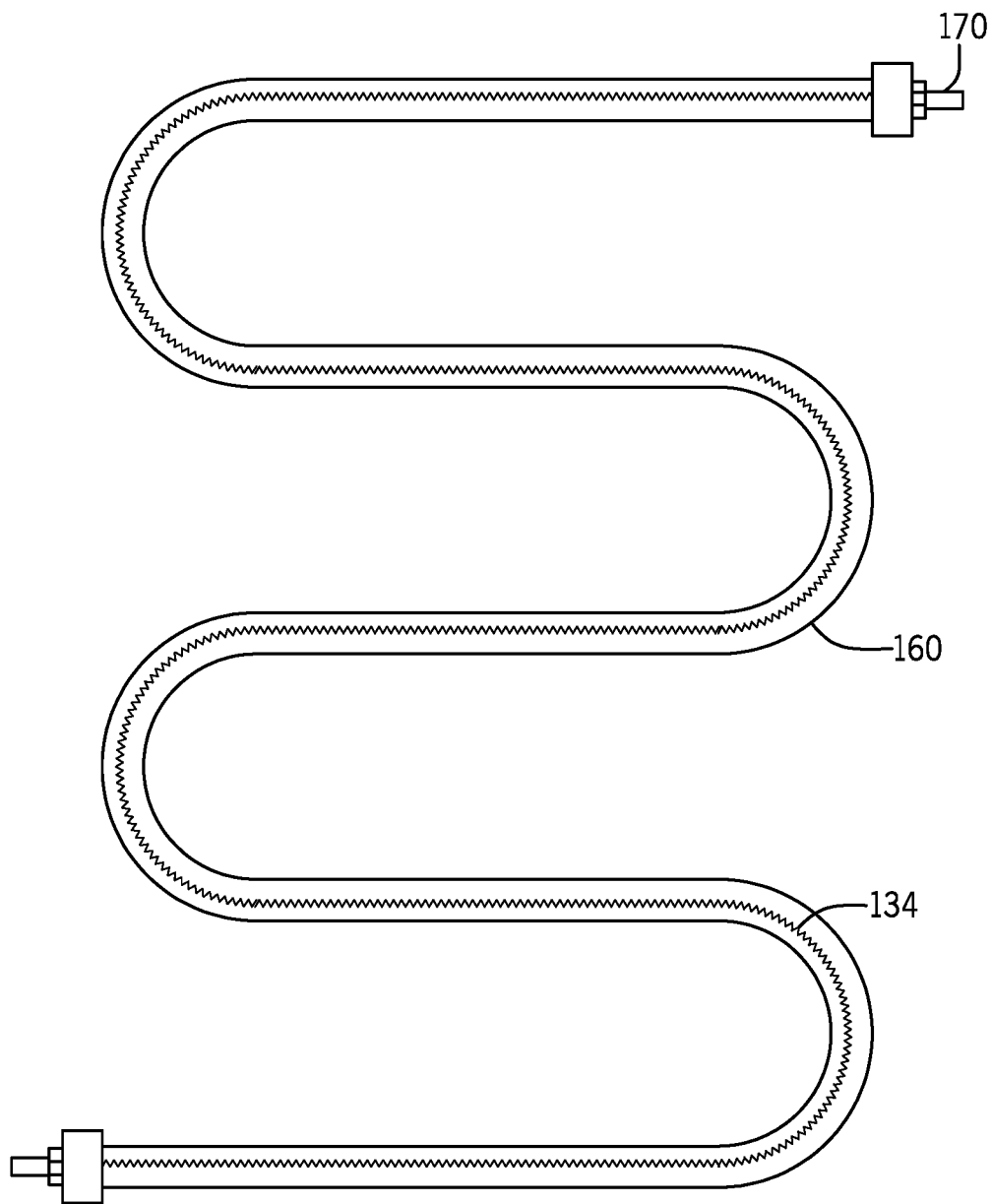
Figure 12:
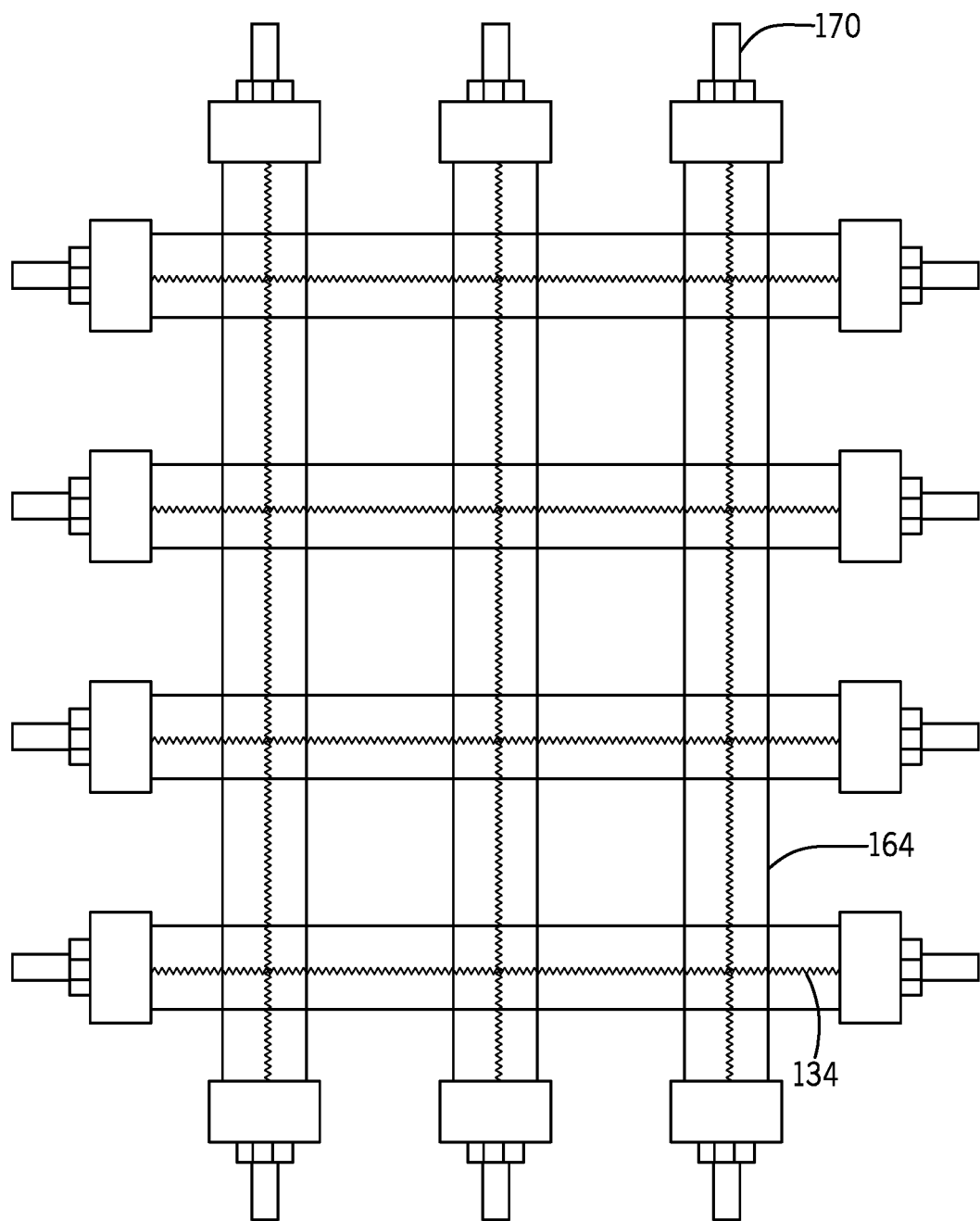

In other embodiments, the troughs 130 and associated resistive heating elements 134 can take on other arrangements besides being generally parallel. For example, as seen in FIG. 9, the trough 152 can be spiral, and in FIG. 10 the troughs 156 can be concentric circles, and in FIG. 11, the trough 160 can be serpentine shaped, and in FIG. 12, the trough 164 can be a grid. Other shapes are possible based on particular applications.

One or more connectors 170 are used to supply power to each heat pack 114 and 118 (see FIG. 8). In some embodiments, upper heat pack 114 and lower heat pack 118 are the same construction with the open gap 132 of upper heat pack 114 facing toward the heating chamber 58 and the open gap 132 of the lower heat pack 118 also facing the heating chamber 58.

Referring to FIGS. 6 and 7, the open gap 132 of trough 130 is shown with a protective cover 180. The cover 180 is shown as a metal panel with a series of perforations 184, e.g., cuts or holes, and can also be made of glass, quartz, or other materials, such as alloys. The cover 180 allows the transmission of infrared radiation, or other forms of heat, e.g., steam, while providing the desired degree of protection for the heating element 134 positioned within the trough 130. It is to be appreciated that any shape of opening can be used in place of cuts or holes. The cover 180 can include a first edge connector 181 and a second edge connector 183. The cover 180 can engage with, e.g., snap into or onto the first side wall 133 and/or the second side wall 135 that forms the open gap 132 of the trough 130, or can be screwed or welded or otherwise removably connected to the trough 130. The cover 180 can extend the full length of the trough 130, or the cover 130 can selectively be positioned on only portions of the trough 130.

Each heat pack 114, 118 as a unit, e.g., trough 130, heating element 134, frame 148, and cover 180, can be removable for cleaning or replacement, or in some embodiments, each heat unit 126 including trough 130, resistive heating element 134 and cover 180, can be removable for cleaning or replacement.

As seen in FIG. 6, the arrangement of troughs 130 are configured to direct the forced convection air, as indicated by flow path arrows 190, from upper air plenum 94 and lower air plenum 98 around the troughs 130, and the resistive heating elements 134, and into the heating chamber 58 to reduce direct contact of the resistive heating element 134 with the forced convection air 190. The forced convection air travels into the heating chamber 58 and back out of the heating chamber 58 by way of draw from the air mover 106, with minimal disruption to the resistive heating element 134 and associated infrared heat.

This diversion of the forced convection air 190 around the resistive heating elements 134 limits the convective cooling of the resistive heating element surface 136, thus allowing better control of the optimal temperatures of the resistive heating element surface 136 for emission of the desired wavelength of the infrared spectrum. In some embodiments, the surface temperature of the resistive heating element 134 is controlled by the control system 82, with feedback from one or more sensors 194 located in a trough 130, for example, or the sensor 194 could be in the heating chamber 58, or other locations throughout the oven 50.

Each resistive heating element 134 can be sized to reach the desired surface temperature by a function of resistivity of the material employed and the voltage applied. The control system 82 can sense the applied voltage and adjust to an equivalent voltage such that performance, i.e., infrared radiation, remains generally consistent over natural voltage variations in power supplies. The control system 82 can be used to select individual heat units 126 to turn on and to turn off. Additionally, the control system 82 can individually control the duty cycle of each heat unit 126 to control and adjust heating within the heating chamber 58 by adjusting the applied voltage.

As seen in FIG. 7, an exemplary resistive heating element 134 is shown as an open helical coil element. Other forms of a resistive heating element 134 can include a sheathed tubular element, a ribbon element, a light bulb, etc. The resistive heating elements 134 can be wired in parallel, series, or parallel-series.

Open coil heating elements are electrical current carrying conductors that should have a degree of protection from vibration, impact, and user contact, while still allowing the desired transmission of infrared radiation. Resistive heating element support structure 200 can be coupled to either, or both, the trough 130 and the cover 180 to provide stability and isolation for the resistive heating element 134. The support structure 200 can include ceramic insulators, as a non-limiting example. Other known insulation materials are possible.

When the oven door 62 is opened to access the heating chamber 58, a switch and/or sensor 210 (see FIG. 4), coupled to the control system 82 can sense the open oven door 62 and remove power from the resistive heating element 134. Ground fault or residual current protection can be provided by a molded case circuit breaker with this function.

To maximize the independent control by the control system 82 of a plurality of heating modes, e.g., convection air and infrared radiation, a resistive heating element of low mass is desirable. The low mass mitigates overshooting a temperature set point within the heating chamber 58.

Figure 13:
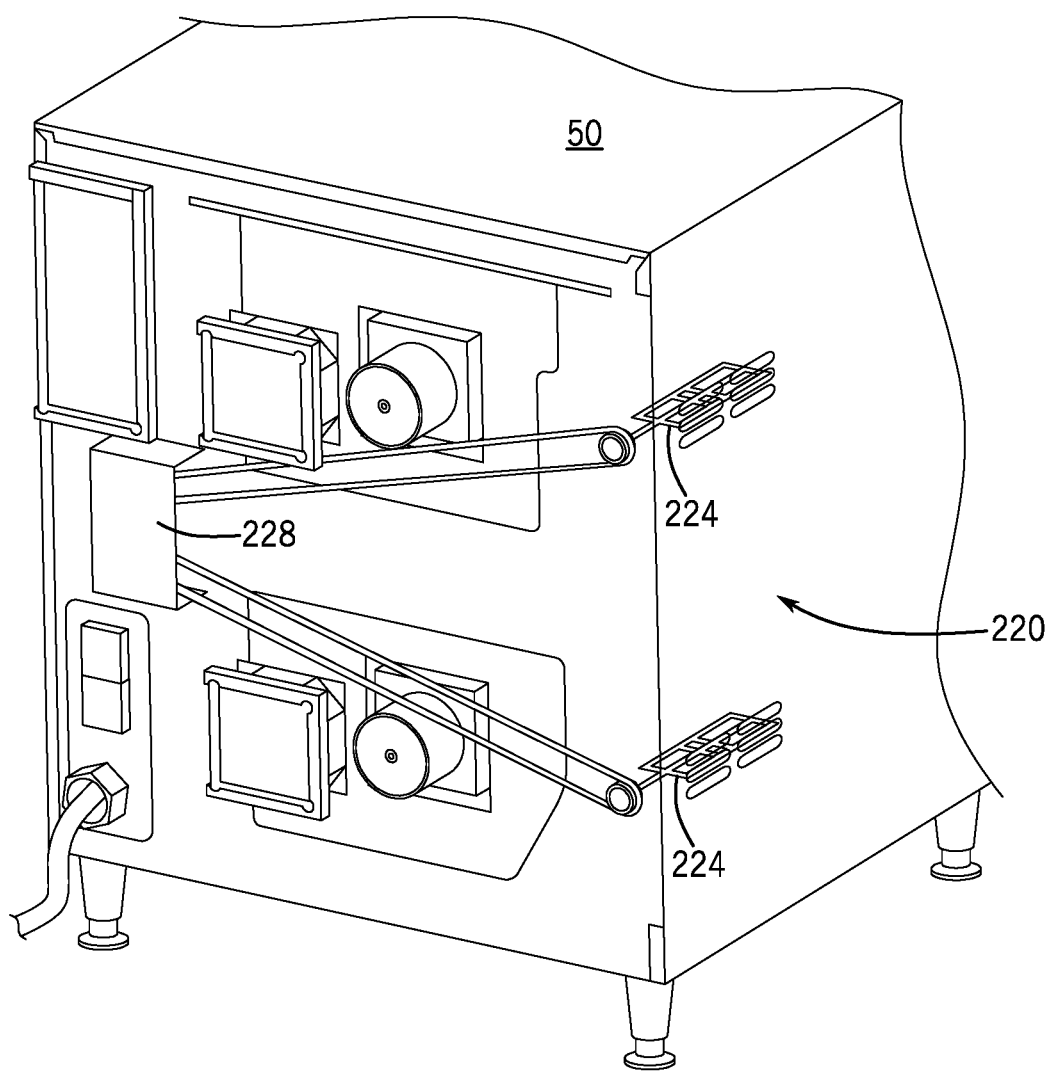
FIG. 13 is a perspective view of an exemplary vent system, according to embodiments of the disclosure.

To further mitigate overshooting a temperature set point, a venting system 220 can be included. As seen in FIG. 13, at least one vent system 220 is shown that includes a baffle or damper 224 that provides a controllable path for hot air to move from the heating chamber 58 to outside the heating chamber 58. The hot air can be vented outside the heating chamber 58 or outside the oven 50, as shown. The damper 224 can be a rotating or sliding damper, for example. The movement of the damper 224 can be controlled by a linear actuator or motor 228, for example, coupled to the control system 82, and can be based on feedback from at least one sensor 232 (see FIG. 4) to monitor the temperature of the heating chamber 58.

Figure 14:
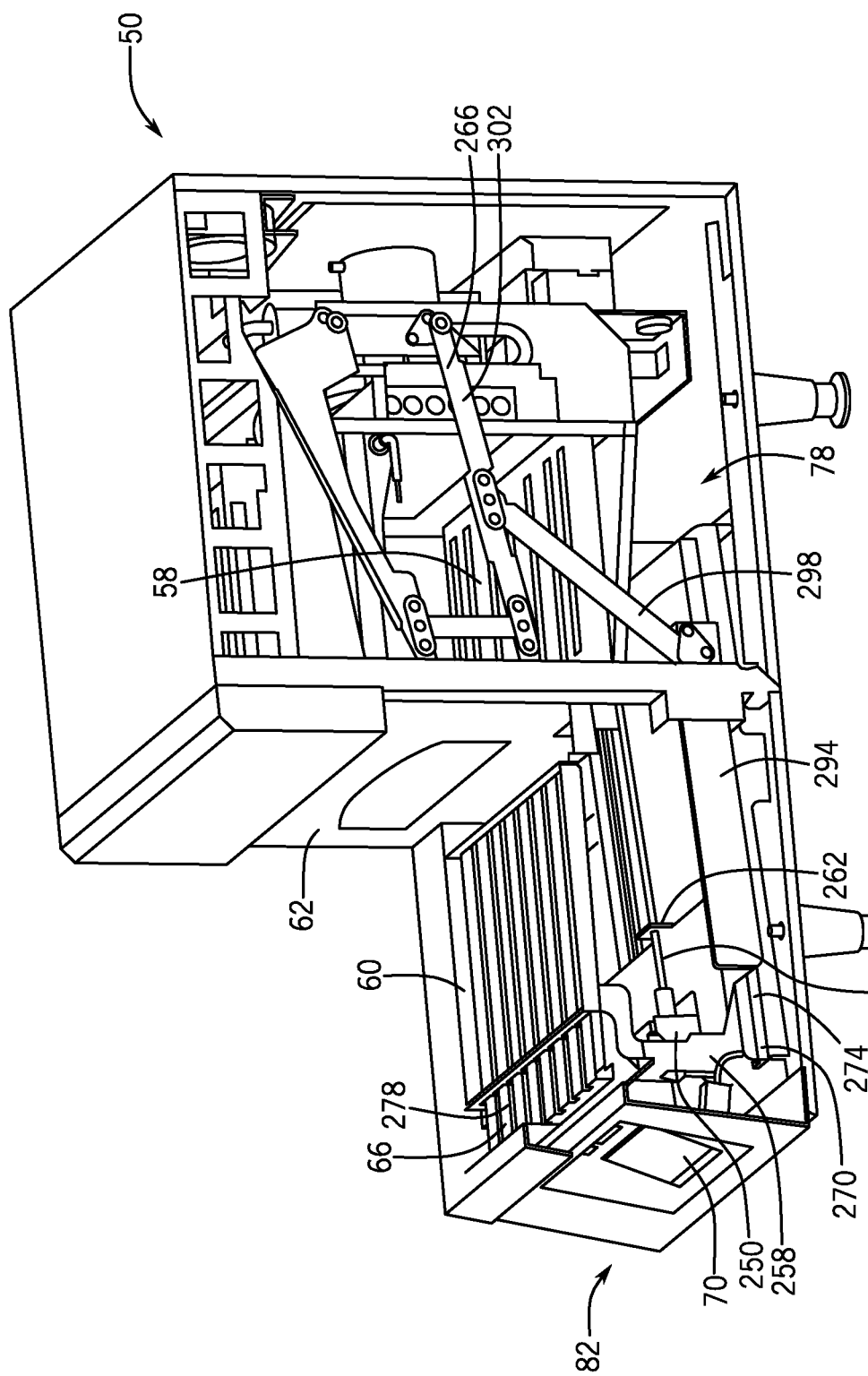
FIG. 14 is a perspective view of an oven with surfaces removed for visibility, and showing aspects of an exemplary system for moving a movable cook surface and an oven door, the movable cook surface being exterior to a heating chamber and the oven door closed, the movable cook surface being at least partially recessed below an exterior nesting rack, according to embodiments of the disclosure.
Figure 15:
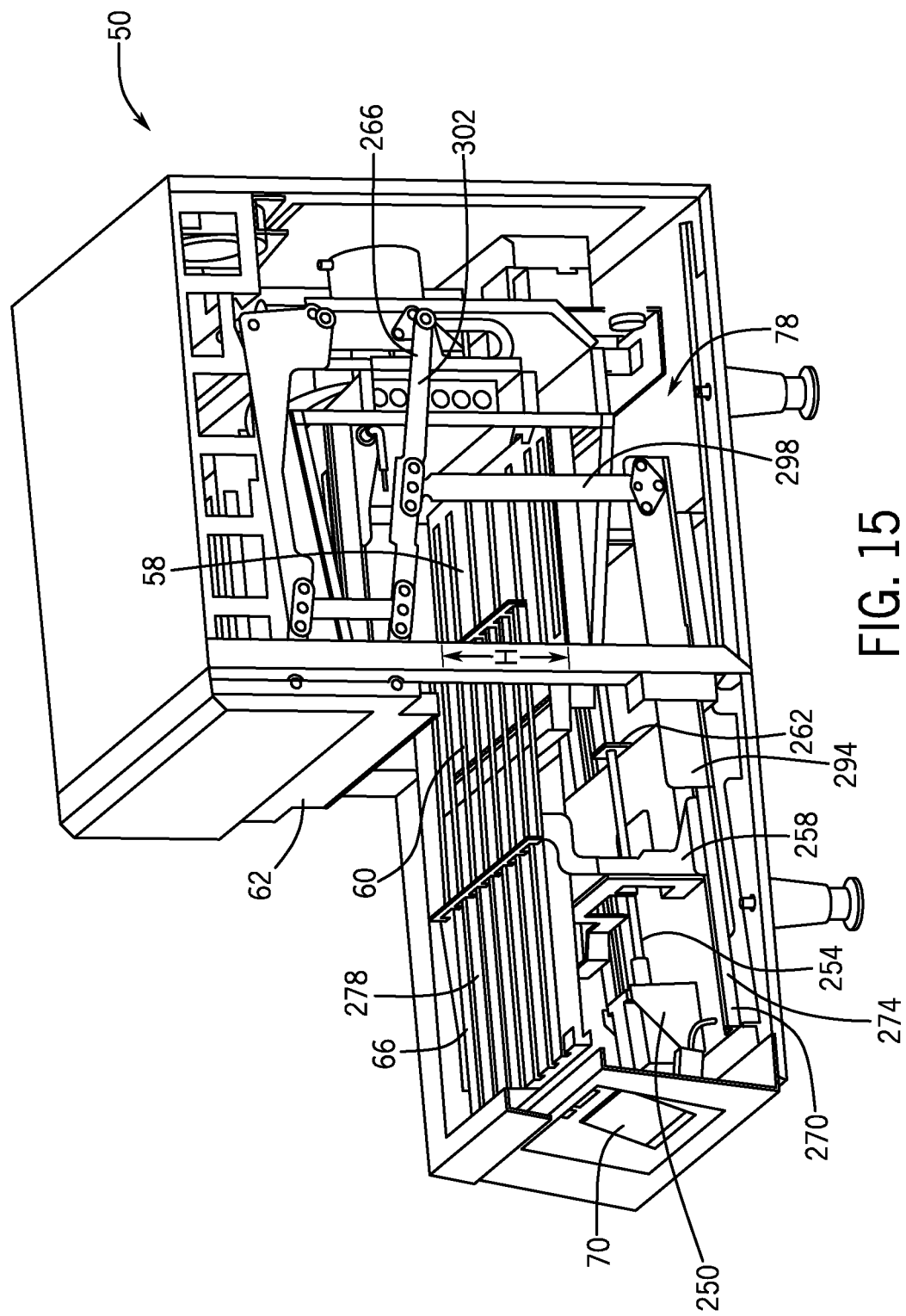
FIG. 15 is a perspective view of the oven of FIG. 14, and showing aspects of an exemplary system for moving the movable cook surface and the oven door, the movable cook surface being partially within the heating chamber and the oven door being partially open, according to embodiments of the disclosure.
Figure 16:
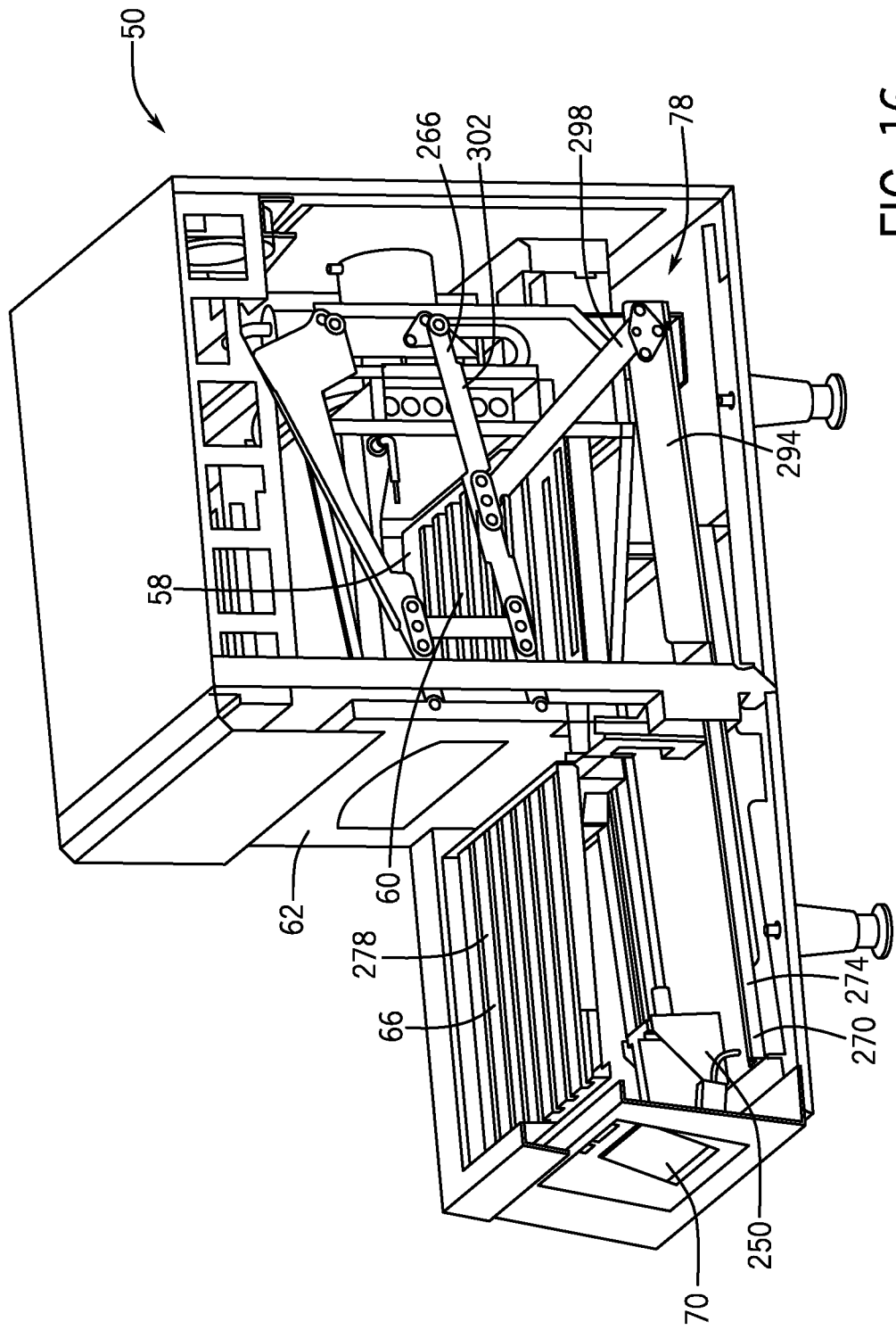
FIG. 16 is a perspective view of the oven of FIG. 14, and showing aspects of an exemplary system for moving the movable cook surface and the oven door, the movable cook surface being completely within the heating chamber and the oven door being completely closed, according to embodiments of the disclosure.

Referring to FIGS. 14-16, the oven 50 can include a movement system 78 for generally horizontally moving the movable cook surface 60 into and out of the heating chamber 58. The movement system 78 can also be used to open and close the oven door 62. In some embodiments, the movement system 78 can both move the movable cook surface 60 and open and close the oven door 62. In other embodiments, a first movement system can move the movable cook surface 60, and a second movement system can open and close the oven door 62.

In an exemplary embodiment, a drive mechanism 250 including a motor, e.g., a brushless DC motor, a servo motor, a stepper motor, or any known motor, can rotate a lead screw 254 creating a linear motion of a carriage 258. In some embodiments, the motion is non-linear. In some embodiments, a lead screw nut 262 can be coupled to the carriage 258 to effect the carriage movement. In some embodiments, the carriage 258 may be driven by a rack and pinion gear system 240 (see FIG. 17), or a guide and slide system 244 (see FIG. 18), or a worm gear system, or a cam and pulley system, all as non-limiting examples.

In some embodiments, the carriage 258 can be coupled to the movable cook surface 60, such that movement of the carriage 258 can move the movable cook surface 60 in and out of the heating chamber 58. In some embodiments, movement of the carriage 258 can also actuate a linkage system 266 to actuate opening and closing of the oven door 62. In some embodiments, the carriage 258 can move along a rail 270 or other support structure. Bearings 274 can be included on either or both of the carriage 258 and the rail 270 to provide a smooth controlled motion of the carriage 258. The movement of the movable cook surface 60 serves to provide an auto load and unload function for item 68 placed on the external nesting rack 66.

The movable cook surface 60 can become at least partially recessed within or below a top surface 278 of the external nesting rack 66 when the movable cook surface 60 is extended outside of the heating chamber 58 (see FIGS. 14-16 and 20-21), such that, when item 68 is on the movable cook surface 60 while the movable cook surface is in the heating chamber, as the movable cook surface 60 extends outside the heating chamber 58, item 68 is transferred from the movable cook surface 60 to the top surface 278 of the external nesting rack as the movable cook surface 60 recesses within or below the external nesting rack 66.

The external nesting rack 66 can be attached to, or placed next to, or can be integral with the housing 54, and can be removable for cleaning, etc. The external nesting rack 66 can be stationary, or the external nesting rack can be actuated to move into position when the movable cook surface is exterior to the heating chamber 58, for example, when the oven door 62 is opening or closing. In some embodiments, the external nesting rack 66 can be recessed or hidden within the oven housing 54, and can flip up or be pulled out or can be moved out by actuation of the movement system 78, as non-limiting examples.

In some embodiments, the movable cook surface 60 can be a wire rack, for example, with fingers 280 and associated spacings 284. The external nesting rack 66 can be arranged such that the fingers 280 of the movable cook surface 60 can move within spacings 286 between support surfaces 288 of the external nesting rack 66. Because the external nesting rack 66 remains exterior to the heating chamber 58, and may not be heated, it generally maintains a temperature closer to the ambient air temperature outside the oven housing 54. With the movable cook surface 60 recessed within or below the external nesting rack 66 (see FIGS. 16 and 21), user exposure to hot surfaces such as the movable cook surface 60 can be minimized. The support surfaces 288 can be coupled to a heat sink to quickly dissipate heat absorbed from the movable cook surface 60 or a hot item 68, for example.

In use, methods for moving an item 68 from the oven 50 can include moving the movable cook surface 60 with the item on the movable cook surface from a position within the heating chamber 58 to a position at least partially external to the heating chamber; and positioning the movable cook surface 60 at least partially recessed below a top surface 278 of the external nesting rack 66, such that the item 68 on the movable cook surface 60 is no longer on the movable cook surface 60 and is transferred to being positioned on the top surface 278 of the external nesting rack 66. The method can further include moving the fingers 280 of the movable cook surface 60 within the spacings 286 between the support surfaces 288 as the movable cook surface 60 is moving between the position within the heating chamber 58 and the position at least partially external to the heating chamber, wherein the item 68 on the movable cook surface 60 is transferred to being positioned on the top surface 278 of the external nesting rack 66 as the movable cook surface 60 is moved at least partially recessed below the top surface 278 of the external nesting rack 66.

The method can further include moving the item 68 into the heating chamber 58 by moving the movable cook surface 60 from the position at least partially recessed below the top surface 278 of the external nesting rack 66, to the position within the heating chamber 58, such that the item 68 on the top surface 278 of the external nesting rack 66 is transferred to being positioned on the movable cook surface 60 and is no longer on the external nesting rack 66.

As a non-limiting example of a linkage system 266, as the carriage 258 and an associated carriage link arm 294 travels towards the heating chamber 58, an oven door timing linkage assembly 298 can push on a lower door arm 302 (in some embodiments this can be a parallel bar assembly), which can cause the oven door 62 to open. The geometry of the lower door arm 302 can pivot and the oven door timing linkage assembly 298 can be positioned to open the oven door 62 to allow the movable cook surface 60 to enter the heating chamber 58. When the oven door timing linkage assembly 298 passes a predetermined vertical position, for example, the motion of the oven door 62 can be reversed, thus closing the oven door 62 as the movable cook surface 60 completes its travel motion into the heating chamber 58. The operation of the drive mechanism 250 can be reversed so as to reverse the motion of the carriage 258 to open the oven door 62 and move the movable cook surface 60 to a position outside the heating chamber 58 and nested or otherwise positioned within or below the exterior nesting rack 66.

Figure 17:
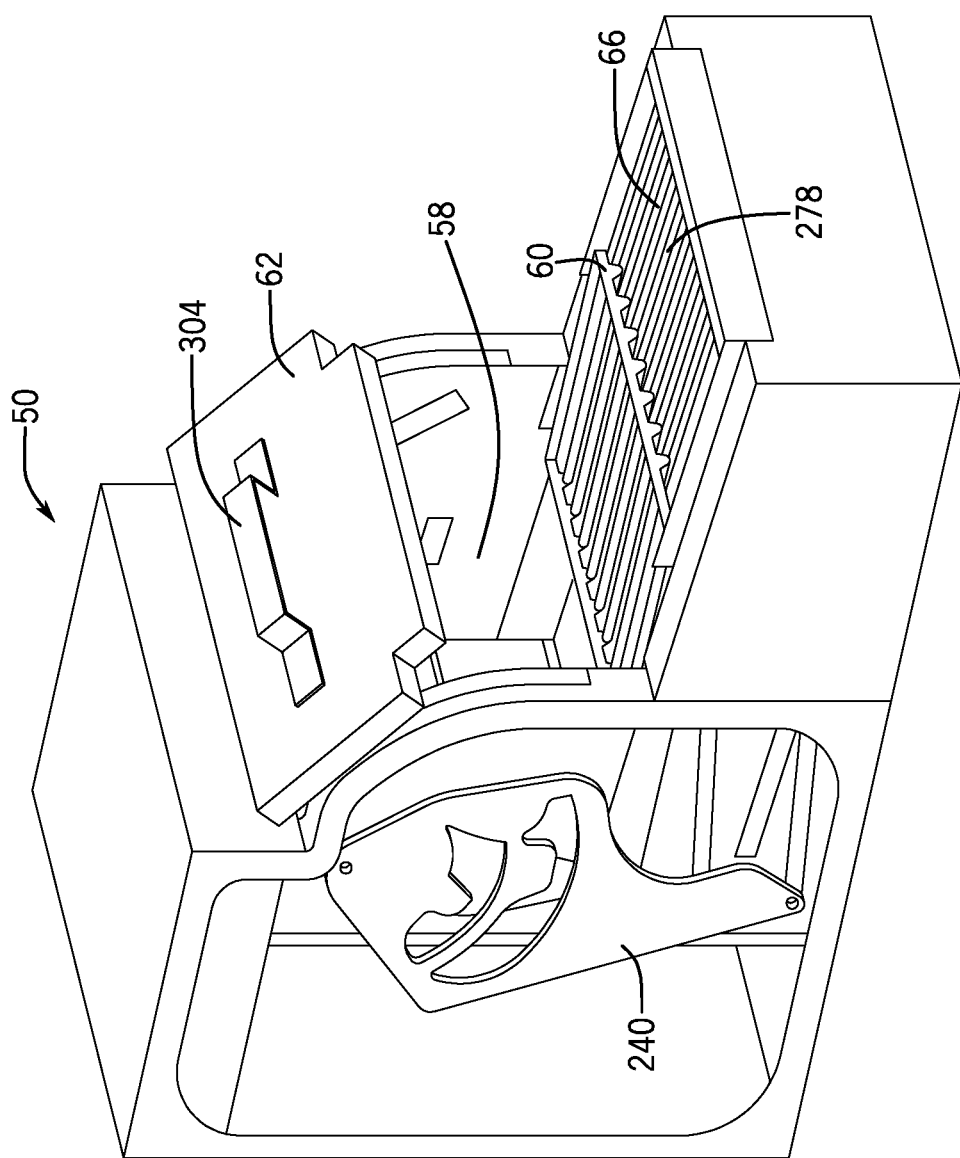
FIG. 17 is a perspective view of an oven sowing an alternative oven door embodiment and alternative system for moving the movable cook surface and the oven door, according to embodiments of the disclosure.
Figure 18:
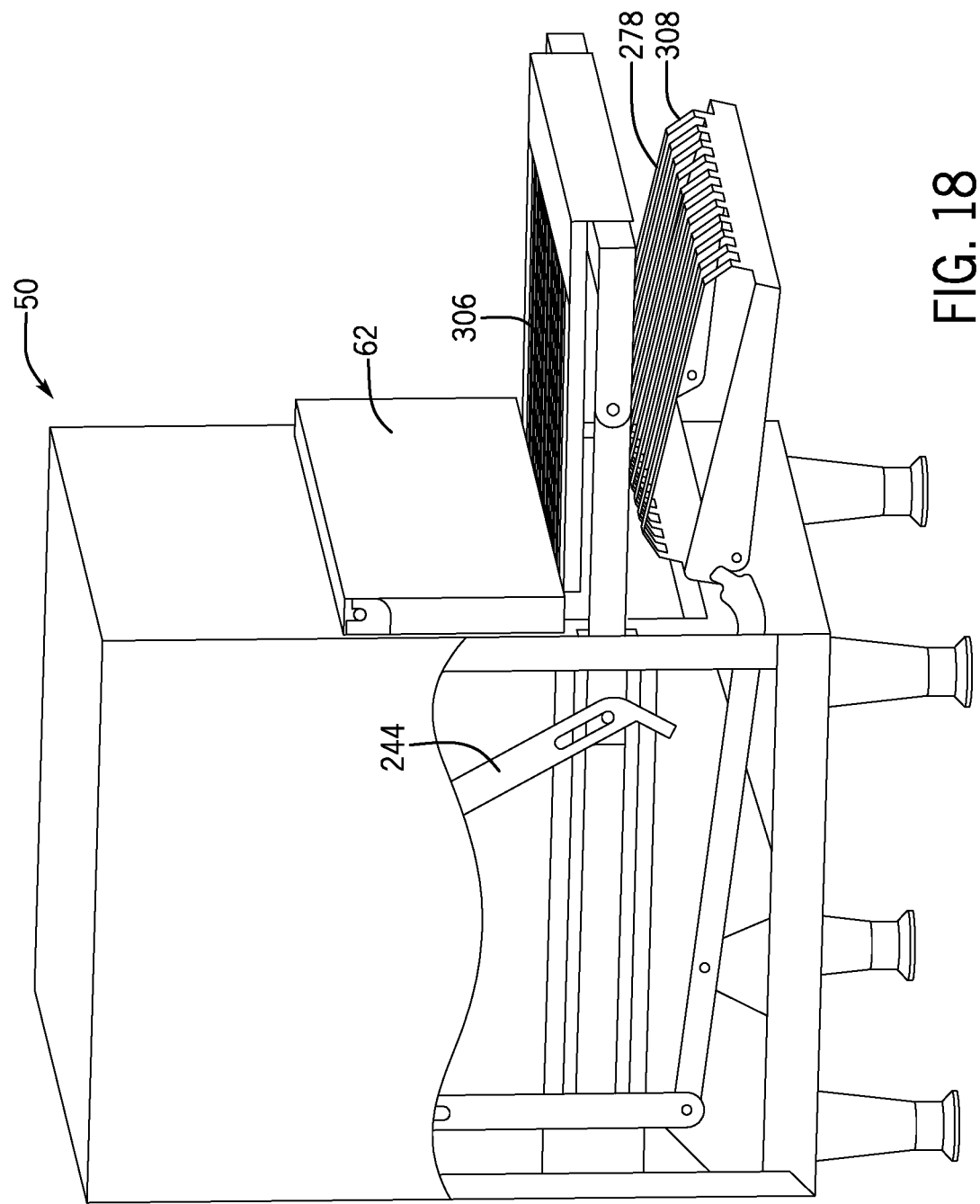
FIG. 18 is a perspective view of an oven having an alternative system for moving the movable cook surface and the oven door, wherein the nesting rack is also moved from a position below the movable cook surface to a position at least partially above the movable cook surface, according to embodiments of the disclosure.
Figure 19:
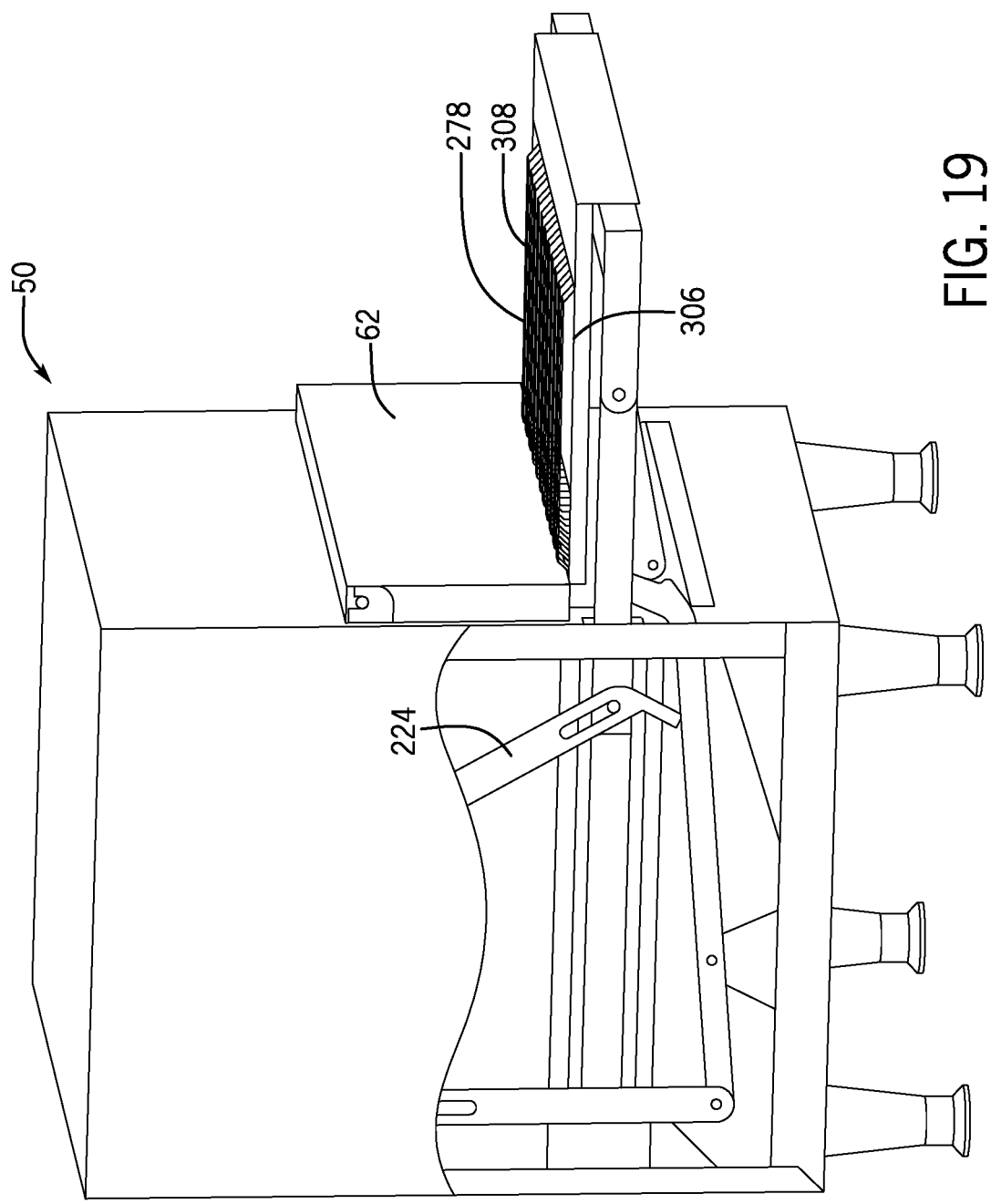
FIG. 19 is a perspective view of the oven of FIG. 18, and showing the nesting rack in a position at least partially above the movable cook surface.
Figure 20:
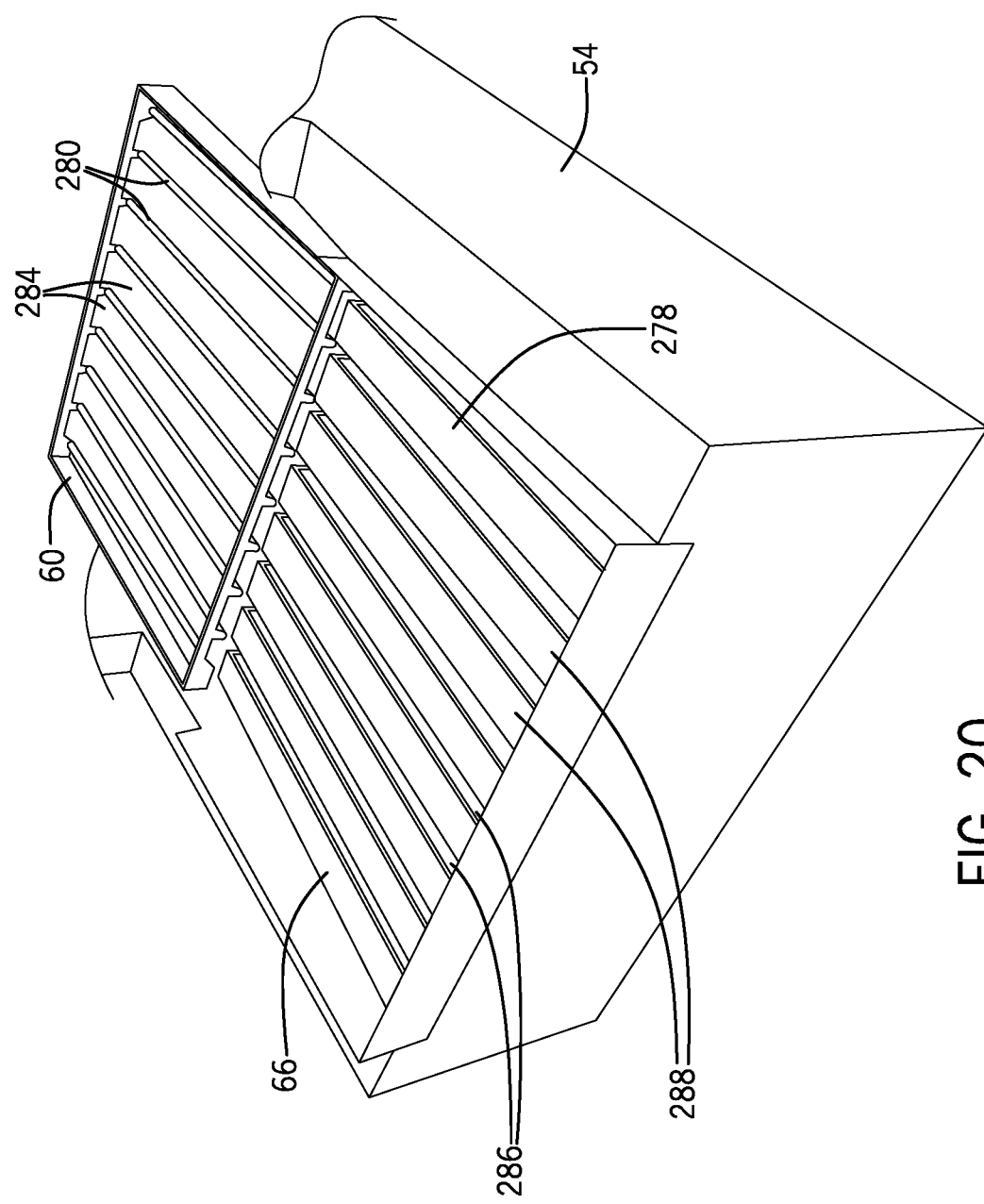
FIG. 20 is a close-up view of an exemplary movable cook surface and nesting rack, the movable cook surface being shown in a position where the movable cook surface is not yet nested with the nesting rack, according to embodiments of the disclosure.
Figure 21:
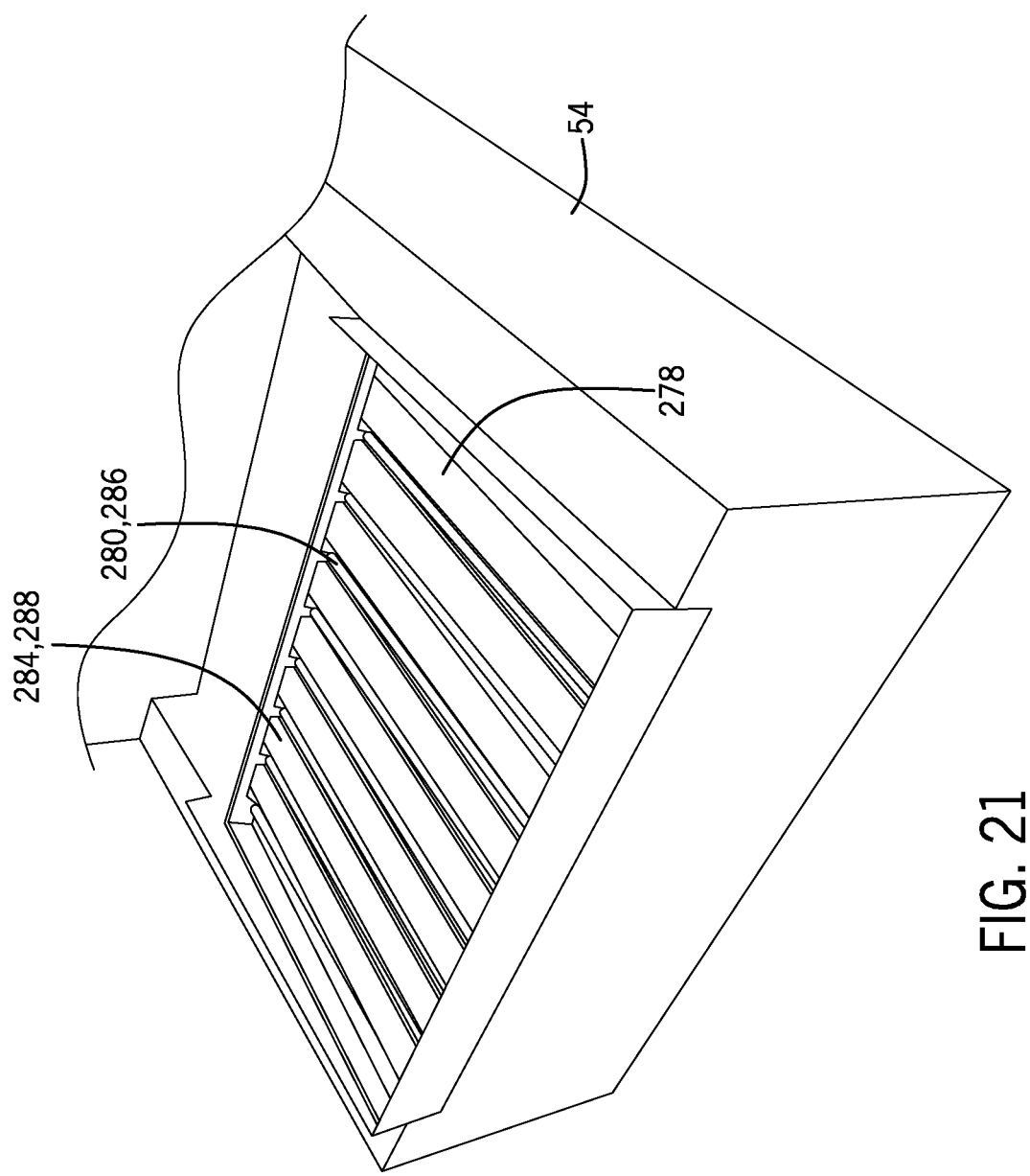
FIG. 21 is a close-up view of the exemplary movable cook surface and nesting rack of FIG. 20, the movable cook surface being shown in a position where the movable cook surface is nested with the nesting rack, and positioned within the nesting rack and at least partially below the nesting rack, according to embodiments of the disclosure.

FIGS. 14-16 primarily show the door 62 is lifted vertically in a generally vertical plane. Other possible door arraignments include, but are not limited to, hinging on any side (left, right, top, or bottom) and pivoting to allow the carriage 258 to enter and exit the heating chamber 58. A double door, i.e., a French door style opening and closing arrangement is also possible. The oven door 62 may also open and close along an arcuate path, as seen in FIG. 17

Timing of the door 62 movement can be controlled by geometric design of the movement system 78, and specifically by the linkage system 266. It is to be appreciated that other arrangements, such as a cam system, chain, screw drive, timing belt, or other means coupled with an electronic control system, sensors, motors, actuators, and gears, can be used to control the timing of the oven door 62, to allow the oven door to open and close to clear a maximum height H allowed by the height of the heating chamber 58.

Although the movable cook surface 60 is described as being moved by a motor, it is to be appreciated that the movable cook surface 60, either alone or in unison with the oven door 62, can also be moved manually via a lever system or by a variety of other motorized or non-motorized linkage movement designs, including a counterbalance system, e.g., with weights and springs. As seen in FIG. 17, a handle 304 can be included on the oven door 62 to manually open and close the oven door, and move the movable cook surface 60 into and out of the heating chamber 58.

The oven 50 can include control system 82. In some embodiments, operating parameters for the oven 50 to cook any items 68 placed on the movable cook surface 60 to be carried into the heating chamber 58 through the oven door 62 can be entered at a user interface control panel 70.

The user interface 70 can be implemented with a touch screen, although it can also be implemented with a keypad and liquid crystal display (LCD), switches, and/or dials, as non-limiting examples. An operator can enter commands, such as mode of operations, cooking temperatures within the heating chamber 58, specific heating elements to be used, cooking times, air mover speeds, venting, etc., via the user interface 70 to effectuate cooking controls on any items placed within the heating chamber 58. The user interface 70 can be associated with a non-volatile memory for storing various cooking instructions, such as cook times, cook temperatures and blower speeds, for different items under the names or graphical representations of corresponding items.

At least one sensor 320 (see FIG. 4), such as a thermocouple, can be coupled to the control system 82 and can be positioned in various locations within the oven housing to measure temperature and other environmental conditions, e.g., humidity, and provide the measured data to the control system. In addition, sensor 232 and sensor 194 can be coupled to the control system 82 to provide additional measurements of temperature and other environmental conditions.

For the avoidance of doubt, aspects of the present disclosure described with respect to the systems are applicable to the methods and aspects described with respect to the methods are applicable to the systems.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of embodiments of the disclosure. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the disclosure.

Although the above discussion discloses various exemplary embodiments of the disclosure, it should be apparent that those skilled in the art can make various modifications that will achieve some of the advantages of the disclosure without departing from the true scope of the disclosure.

We claim:

1. An oven comprising:
   a housing;
   a heating chamber positioned within the housing;
   at least one oven door to provide access to the heating chamber;
   a cavity within the housing for distribution to an upper air plenum and a lower air plenum to provide an air convection;
   a cook surface positioned in the heating chamber, the cook surface to support an item for heating within the heating chamber;
   an upper heat pack positioned between the upper air plenum and the cook surface to direct infrared heat downward into the heating chamber;
   a lower heat pack positioned between the lower air plenum and the cook surface to direct infrared heat upward into the heating chamber;
   the upper heat pack including a plurality of upper heat units supported by an upper frame and being generally parallel to each other with a predetermined space between each upper heat unit, each upper heat unit including an upper heat unit trough, the upper heat unit trough including an open gap between at least an upper heat unit trough first side wall and an upper heat unit trough second side wall, the upper heat unit trough forming a protective housing for at least one upper heat unit resistive heating element positioned within the upper heat unit trough and supported by an upper heat unit heating element support structure, and an upper heat unit cover positioned on the open gap, the upper heat unit cover including a series of perforations;
   the lower heat pack including a plurality of lower heat units supported by a lower frame and being generally parallel to each other with a predetermined space between each lower heat unit, each lower heat unit including a lower heat unit trough, the lower heat unit trough including an open gap between at least a lower heat unit trough first side wall and a lower heat unit trough second side wall, the lower heat unit trough forming a protective housing for at least one lower heat unit resistive heating element positioned within the lower heat unit trough and supported by a lower heat unit heating element support structure, and a lower heat unit cover positioned on the open gap, the lower heat unit cover including a series of perforations;
   wherein the air passes out of the upper air plenum and into the predetermined space between each upper heat unit and then into the heating chamber such that a flow path of the air convection is directed to avoid contact with the upper heat unit resistive heating element positioned within the upper heat unit trough; and
   wherein the air passes out of the lower air plenum and into the predetermined space between each lower heat unit and then into the heating chamber such that the flow path of the air convection is directed to avoid contact with the lower heat unit resistive heating element positioned within the lower heat unit trough.

2. The oven according to claim 1, further including a user interface, the user interface to allow individual control of the upper heat pack and the lower heat pack.

3. The oven according to claim 2, wherein the user interface further allows individual control of each upper heat unit in the upper heat pack and each lower heat unit in the lower heat pack.

4. The oven according to claim 1, wherein the upper heat unit cover includes an upper heat unit cover first edge connector and an upper heat unit cover second edge connector, the upper heat unit cover first edge connector to engage with the upper heat unit trough first side wall and the upper heat unit cover second edge connector to engage with the upper heat unit trough second side wall; and
   the lower heat unit cover includes a lower heat unit cover first edge connector and a lower heat unit cover second edge connector, the lower heat unit cover first edge connector to engage with the lower heat unit trough first side wall and the lower heat unit cover second edge connector to engage with the lower heat unit trough second side wall.

5. The oven according to claim 1, wherein the upper heat unit heating element support structure is coupled to at least one of the upper heat unit trough and the upper heat unit cover, the upper heat unit heating element support structure to isolate the at least one upper heat unit heating element from the upper heat unit trough and the upper heat unit cover; and
   the lower heat unit heating element support structure is coupled to at least one of the lower heat unit trough and the lower heat unit cover, the lower heat unit heating element support structure to isolate the at least one lower heat unit heating element from the lower heat unit trough and the lower heat unit cover.

6. The oven according to claim 1, wherein the upper heat unit resistive heating element is at least one of an open coil resistive heating element, a sheathed tubular resistive element, a ribbon resistive heating element, and an infrared heating lightbulb; and
   the lower heat unit resistive heating element is at least one of an open coil resistive heating element, a sheathed tubular resistive element, a ribbon resistive heating element, and an infrared heating lightbulb.

7. The oven according to claim 1, wherein the upper heat unit heating element support structure is a ceramic material; and
   the lower heat unit heating element support structure is a ceramic material.

8. The oven according to claim 1, further including an external nesting rack positionable on or near the housing; and
   the cook surface being movable, the movable cook surface movable between a position within the heating chamber and a position at least partially external to the heating chamber, such that when the movable cook surface is in the position at least partially external to the heating chamber, the movable cook surface is positioned at least partially recessed below a top surface of the external nesting rack.

9. The oven according to claim 8, further including a movement system to move the movable cook surface.

10. The oven according to claim 1, wherein a heating element heats the air within the cavity for distribution to the upper air plenum and the lower air plenum.

11. The oven according to claim 10, wherein the heating element provides heated air convection to the heating chamber.

12. The oven according to claim 1, wherein the plurality of upper heat units and the plurality of lower heat units are substantially straight.

13. An oven comprising:
a housing;
a heating chamber positioned within the housing;
at least one oven door to provide access to the heating chamber;
a cavity within the housing for distribution to an upper air plenum and a lower air plenum to provide an air convection;
a cook surface positioned in the heating chamber, the cook surface to support an item for heating within the heating chamber;
an upper heat pack positioned between the upper air plenum and the cook surface to direct infrared heat downward into the heating chamber;
a lower heat pack positioned between the lower air plenum and the cook surface to direct infrared heat upward into the heating chamber;
a user interface to allow individual control of the upper heat pack and the lower heat pack;
the upper heat pack including a plurality of upper heat units supported by an upper frame and being generally parallel to each other with a predetermined space between each upper heat unit, each upper heat unit including an upper heat unit trough, the upper heat unit trough including an open gap between at least an upper heat unit trough first side wall and an upper heat unit trough second side wall, the upper heat unit trough forming a protective housing for at least one upper heat unit resistive heating element positioned within the upper heat unit trough and supported by an upper heat unit heating element support structure, and an upper heat unit cover positioned on the open gap, the upper heat unit cover including a series of perforations;
the lower heat pack including a plurality of lower heat units supported by a lower frame and being generally parallel to each other with a predetermined space between each lower heat unit, each lower heat unit including a lower heat unit trough, the lower heat unit trough including an open gap between at least a lower heat unit trough first side wall and a lower heat unit trough second side wall, the lower heat unit trough forming a protective housing for at least one lower heat unit resistive heating element positioned within the lower heat unit trough and supported by a lower heat unit heating element support structure, and a lower heat unit cover positioned on the open gap, the lower heat unit cover including a series of perforations;
wherein the air passes through the upper air plenum and the predetermined space between each upper heat unit and into the heating chamber such that a flow path of the air convection is directed to avoid contact with the upper heat unit resistive heating element positioned within the upper heat unit trough; and
wherein the air passes through the lower air plenum and the predetermined space between each lower heat unit and into the heating chamber such that the flow path of the air convection is directed to avoid contact with the lower heat unit resistive heating element positioned within the lower heat unit trough.

14. The oven according to claim 13, wherein the user interface further allows individual control of each upper heat unit in the upper heat pack and each lower heat unit in the lower heat pack.

15. The oven according to claim 13, wherein the upper heat unit cover includes an upper heat unit cover first edge connector and an upper heat unit cover second edge connector, the upper heat unit cover first edge connector to engage with the upper heat unit trough first side wall and the upper heat unit cover second edge connector to engage with the upper heat unit trough second side wall; and
the lower heat unit cover includes a lower heat unit cover first edge connector and a lower heat unit cover second edge connector, the lower heat unit cover first edge connector to engage with the lower heat unit trough first side wall and the lower heat unit cover second edge connector to engage with the lower heat unit trough second side wall.

16. The oven according to claim 13, wherein the upper heat unit heating element support structure is coupled to at least one of the upper heat unit trough and the upper heat unit cover, the upper heat unit heating element support structure to isolate the at least one upper heat unit heating element from the upper heat unit trough and the upper heat unit cover; and
the lower heat unit heating element support structure is coupled to at least one of the lower heat unit trough and the lower heat unit cover, the lower heat unit heating element support structure to isolate the at least one lower heat unit heating element from the lower heat unit trough and the lower heat unit cover.

17. The oven according to claim 13, wherein the upper heat unit resistive heating element is at least one of an open coil resistive heating element, a sheathed tubular resistive element, a ribbon resistive heating element, and an infrared heating lightbulb; and
the lower heat unit resistive heating element is at least one of an open coil resistive heating element, a sheathed tubular resistive element, a ribbon resistive heating element, and an infrared heating lightbulb.

18. The oven according to claim 13, wherein the upper heat unit heating element support structure is a ceramic material; and
the lower heat unit heating element support structure is a ceramic material.

19. The oven according to claim 13, further including an external nesting rack positionable on or near the housing; and
the cook surface being movable, the movable cook surface movable between a position within the heating chamber and a position at least partially external to the heating chamber, such that when the movable cook surface is in the position at least partially external to the heating chamber, the movable cook surface is positioned at least partially recessed below a top surface of the external nesting rack; and
a movement system to move the movable cook surface.

20. The oven according to claim 13, wherein a heating element heats the air within the cavity for distribution to the upper air plenum and the lower air plenum.

21. The oven according to claim 20, wherein the heating element provides heated air convection to the heating chamber.

22. The oven according to claim 13, wherein the plurality of upper heat units and the plurality of lower heat units are substantially straight.

23. An oven comprising:
a housing;
a heating chamber positioned within the housing;
at least one oven door to provide access to the heating chamber;
a cavity within the housing for distribution to an upper air plenum and a lower air plenum to provide an air convection;

a cook surface positioned in the heating chamber, the cook surface to support an item for heating within the heating chamber;

an upper heat pack positioned between the upper air plenum and the cook surface to direct infrared heat downward into the heating chamber;

a lower heat pack positioned between the lower air plenum and the cook surface to direct infrared heat upward into the heating chamber;

the upper heat pack including a plurality of upper heat units supported by an upper frame and being generally parallel to each other with a predetermined space between each upper heat unit, each upper heat unit including an upper heat unit trough, the upper heat unit trough including an open gap between at least an upper heat unit trough first side wall and an upper heat unit trough second side wall, the upper heat unit trough forming a protective housing for at least one upper heat unit resistive heating element positioned within the upper heat unit trough and supported by an upper heat unit heating element support structure, and an upper heat unit cover positioned on the open gap, the upper heat unit cover including a series of perforations;

the lower heat pack including a plurality of lower heat units supported by a lower frame and being generally parallel to each other with a predetermined space between each lower heat unit, each lower heat unit including a lower heat unit trough, the lower heat unit trough including an open gap between at least a lower heat unit trough first side wall and a lower heat unit trough second side wall, the lower heat unit trough forming a protective housing for at least one lower heat unit resistive heating element positioned within the lower heat unit trough and supported by a lower heat unit heating element support structure, and a lower heat unit cover positioned on the open gap, the lower heat unit cover including a series of perforations;

wherein the upper heat unit heating element support structure is coupled to at least one of the upper heat unit trough and the upper heat unit cover, the upper heat unit heating element support structure to isolate the at least one upper heat unit heating element from the upper heat unit trough and the upper heat unit cover;

wherein the lower heat unit heating element support structure is coupled to at least one of the lower heat unit trough and the lower heat unit cover, the lower heat unit heating element support structure to isolate the at least one lower heat unit heating element from the lower heat unit trough and the lower heat unit cover;

wherein the air passes through the upper air plenum and the predetermined space between each upper heat unit and into the heating chamber such that a flow path of the air convection is directed to avoid contact with the upper heat unit resistive heating element positioned within the upper heat unit trough; and wherein the air passes through the lower air plenum and the predetermined space between each lower heat unit and into the heating chamber such that the flow path of the air convection is directed to avoid contact with the lower heat unit resistive heating element positioned within the lower heat unit trough.

24. The oven according to claim 23, wherein a user interface allows individual control of each upper heat unit in the upper heat pack and each lower heat unit in the lower heat pack.

25. The oven according to claim 23, wherein the upper heat unit cover includes an upper heat unit cover first edge connector and an upper heat unit cover second edge connector, the upper heat unit cover first edge connector to engage with the upper heat unit trough first side wall and the upper heat unit cover second edge connector to engage with the upper heat unit trough second side wall; and the lower heat unit cover includes a lower heat unit cover first edge connector and a lower heat unit cover second edge connector, the lower heat unit cover first edge connector to engage with the lower heat unit trough first side wall and the lower heat unit cover second edge connector to engage with the lower heat unit trough second side wall.

26. The oven according to claim 23, wherein the upper heat unit resistive heating element is at least one of an open coil resistive heating element, a sheathed tubular resistive element, a ribbon resistive heating element, and an infrared heating lightbulb; and the lower heat unit resistive heating element is at least one of an open coil resistive heating element, a sheathed tubular resistive element, a ribbon resistive heating element, and an infrared heating lightbulb.

27. The oven according to claim 23, wherein the upper heat unit heating element support structure is a ceramic material; and the lower heat unit heating element support structure is a ceramic material.

28. The oven according to claim 23, further including an external nesting rack positionable on or near the housing; and the cook surface being movable, the movable cook surface movable between a position within the heating chamber and a position at least partially external to the heating chamber, such that when the movable cook surface is in the position at least partially external to the heating chamber, the movable cook surface is positioned at least partially recessed below a top surface of the external nesting rack; and a movement system to move the movable cook surface.

29. The oven according to claim 23, wherein a heating element heats the air within the cavity for distribution to the upper air plenum and the lower air plenum.

30. The oven according to claim 23, wherein the heating element provides heated air convection to the heating chamber.

31. The oven according to claim 23, wherein the plurality of upper heat units and the plurality of lower heat units are substantially straight.

* * * * *